United States Patent
Okura et al.

(10) Patent No.: US 10,740,562 B2
(45) Date of Patent: Aug. 11, 2020

(54) SEARCH APPARATUS, ENCODING METHOD, AND SEARCH METHOD BASED ON MORPHEME POSITION IN A TARGET DOCUMENT

(71) Applicant: FUJITSU LIMITED, Kawasaki-shi, Kanagawa (JP)

(72) Inventors: Seiji Okura, Meguro (JP); Masahiro Kataoka, Kamakura (JP); Masao Ideuchi, Hachioji (JP); Fumiaki Nakamura, Sumida (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 15/650,310

(22) Filed: Jul. 14, 2017

(65) Prior Publication Data
US 2018/0024990 A1   Jan. 25, 2018

(30) Foreign Application Priority Data
Jul. 19, 2016   (JP) .................................. 2016-141598

(51) Int. Cl.
*G06F 17/22*   (2006.01)
*G06F 17/27*   (2006.01)
*G06F 40/30*   (2020.01)
*G06F 16/93*   (2019.01)
*G06F 16/33*   (2019.01)

(52) U.S. Cl.
CPC .......... *G06F 40/30* (2020.01); *G06F 16/3344* (2019.01); *G06F 16/93* (2019.01)

(58) Field of Classification Search
CPC .......................... G06F 17/2223; G06F 17/2755
(Continued)

(56) References Cited

U.S. PATENT DOCUMENTS 8,126,713 B2 *  2/2012  Huang ................ G06F 17/2755
                                                            704/254
2010/0085222 A1  4/2010  Kataoka et al.
(Continued)

FOREIGN PATENT DOCUMENTS

JP       2-58166 A    2/1990
JP       11-85790 A   3/1999
(Continued)

OTHER PUBLICATIONS

Decision of Refusal issued in Japanese Application 2016-141598 dated Jan. 22, 2020.
(Continued)

*Primary Examiner* — Farzad Kazeminezhad
(74) *Attorney, Agent, or Firm* — Xsensus LLP

(57) ABSTRACT

A computer generates semantic structure information from a document. The semantic structure information includes a plurality of semantic structures in a plurality of sentences in the document and a plurality of morphemes included in each of the plurality of sentences belong to a corresponding semantic structure. The computer generates a plurality of codes by encoding the plurality of morphemes for each of the plurality of sentences. The computer specifies a specific code that corresponds to a specific morpheme from among the plurality of morphemes included in each of the plurality of sentences, wherein at least one morpheme is potentially missing in a semantic structure that the specific morpheme belongs to. A missing-portion information indicates the missing morpheme is included in a prior sentence in the document. The computer adds missing-portion information to the specific code for each of the plurality of sentences.

10 Claims, 31 Drawing Sheets

(58) Field of Classification Search
USPC .......................................................... 704/254
See application file for complete search history.

(56) References Cited

U.S. PATENT DOCUMENTS

| | | |
|---|---|---|
| 2012/0183935 A1 | 7/2012 | Hamada |
| 2013/0086086 A1 | 4/2013 | Kataoka |
| 2013/0332433 A1 | 12/2013 | Kataoka |
| 2018/0143954 A1* | 5/2018 | Nakamura .......... G06F 17/2223 |

FOREIGN PATENT DOCUMENTS

| | | |
|---|---|---|
| JP | 2005-208782 A | 8/2005 |
| JP | 2010-93414 | 4/2010 |
| JP | 2012-22599 | 2/2012 |
| JP | 2012-150586 | 8/2012 |
| JP | 2013-186766 | 9/2013 |
| WO | WO 2011/148511 A1 | 12/2011 |
| WO | WO 2012/111078 A1 | 8/2012 |

OTHER PUBLICATIONS

Seiji Okura Development of Semantic Structure Search System to which it Corresponded to One Person and Complicated Sentence, 20th Time of Other Society [Language-Processing ] Annual Meeting Announcement Collected-Papers [Online], Japan, Language-Processing Society, Mar. 10, 2014, 6 pp.
Japanese Office Action dated Sep. 10, 2019, issued in corresponding Japanese Patent Application No. 2016-141598.

* cited by examiner

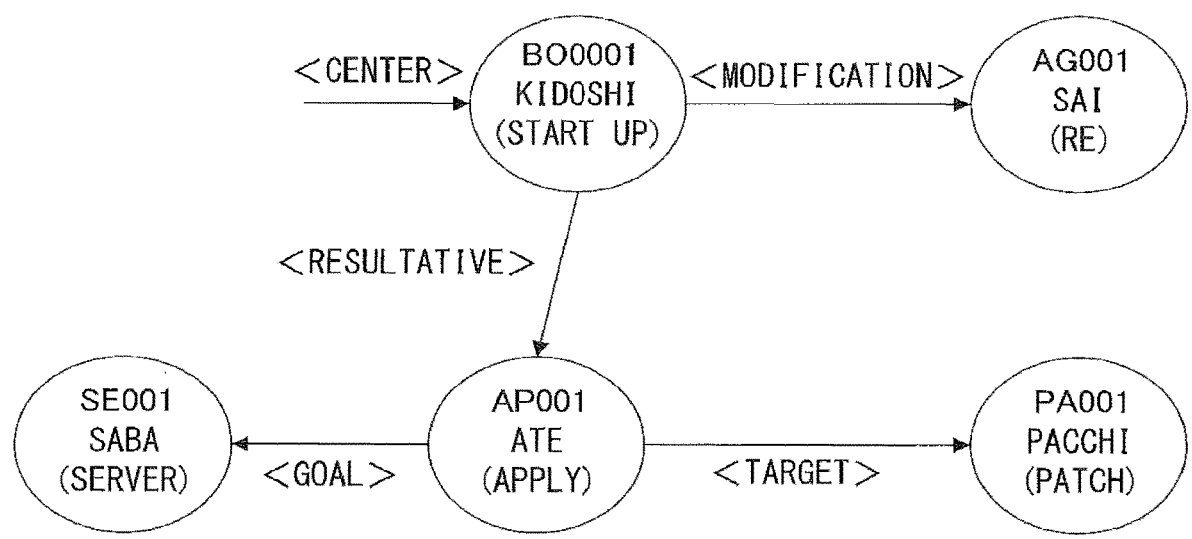
F I G. 1

| SENTENCE NUMBER | 1 | | | | | | | | | | 2 | | | | |
|---|---|---|---|---|---|---|---|---|---|---|---|---|---|---|---|
| POSITION FROM HEAD OF SENTENCE | 1 | 2 | 3 | 4 | 5 | 6 | 7 | 8 | 9 | 10 | 1 | 2 | 3 | 4 | 5 |
| MORPHEME | PACCHI (PATCH) | WA | SABA (SERVER) | NI (TO) | ATE (APPLY) | TE | SAI (RE) | KIDOSHI (START UP) | TA (WAS) | | SURUTO (THEN) | KIDOSHI (START UP) | NAKAT (NOT) | TA (DID) | |
| ADDITIONAL INFORMATION — REFERENCE FLAG | 1 | 0 | 1 | 0 | 1 | 0 | 1 | 1 | 0 | 0 | 1 | 1 | 0 | 0 | 0 |
| ADDITIONAL INFORMATION — ANAPHORA INFORMATION | 0 | 0 | 0 | 0 | 0 | 0 | 0 | 0 | 0 | 0 | 0 | 11 | 0 | 0 | 0 |

F I G. 1 1

| SENTENCE 1 | PA001 | SE001 | AP001 | AG001 | BO001 |
|---|---|---|---|---|---|
| PA001 | | 3: | 2:-TARGET | 4: | 3: |
| SE001 | 3: | | 2:-GOAL | 4: | 3: |
| AP001 | 2:+TARGET | 2:+GOAL | | 3: | 2:-RESULTATIVE |
| AG001 | 4: | 4: | 3: | | 2:-MODIFICATION |
| BO001 | 3: | 3: | 2:+RESULTATIVE | 2:+MODIFICATION | |

F I G. 1 2

| SENTENCE 2 | TH001 | BO001 |
|---|---|---|
| TH001 | | 2:-RESULTATIVE |
| BO001 | 2:+RESULTATIVE | DENIAL |

F I G. 1 3

| ARC | CODE |
|---|---|
| AGENT | 1 |
| CONDITION | 2 |
| TARGET | 3 |
| NON-RESULTATIVE | 4 |
| RESULTATIVE | 5 |
| GOAL | 6 |
| MODIFICATION | 7 |
| DENIAL | −1 |

| SEARCH REQUEST | SE001 | BO001 |
|---|---|---|
| SE001 | | 1:-AGENT |
| BO001 | 1:+AGENT | DENIAL |

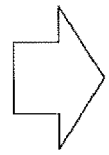
FIG. 25

SEMANTIC STRUCTURE INFORMATION A  BO001: 011 011 010 001 000 00000101 00000111 (=3 3 2 1 0 5 7)
SEMANTIC STRUCTURE INFORMATION B  BO001: 001 111 00000001 11111111 (=1 -1 1 -1)
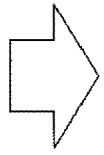
| | 1 | 2 | 3 | 4 | 5 |
|---|---|---|---|---|---|
| SEMANTIC CODE LIST OF A | PA001 | SE001 | AP001 | AG001 | BO001 |
| SEMANTIC CODE LIST OF B | SE001 | BO001 | | | |
| 011 | 000 |
|---|---|
| 001 | 111 |
A' BO001:
B' BO001:
A' − B'
| 010 | 001 |
|---|---|
| SE001 | BO001 |
FIG. 26

FIG. 27

| SENTENCE NUMBER | | 1 | | | | | | | | | | 2 | | | | |
|---|---|---|---|---|---|---|---|---|---|---|---|---|---|---|---|---|
| POSITION FROM HEAD OF SENTENCE | | 1 | 2 | 3 | 4 | 5 | 6 | 7 | 8 | 9 | 10 | 1 | 2 | 3 | 4 | 5 |
| MORPHEME | | PACCHI (PATCH) | HA | SABA (SERVER) | NI (TO) | ATE (APPLY) | TE | SAI (RE) | KIDOSHI (START UP) | TA (WAS) | . | SURUTO (THEN) | KIDOSHI (START UP) | NAKAT (NOT) | TA (DID) | . |
| ADDITIONAL INFORMATION | DENIAL FLAG | 0 | 0 | 0 | 0 | 0 | 0 | 0 | 0 | 0 | 0 | 0 | 1 | 0 | 0 | 0 |
| | REFERENCE FLAG | 1 | 0 | 1 | 0 | 1 | 0 | 1 | 1 | 0 | 0 | 1 | 1 | 0 | 0 | 0 |
| | ANAPHORA INFORMATION | 0 | 0 | 0 | 0 | 0 | 0 | 0 | 0 | 0 | 0 | 0 | 1:1 | 0 | 0 | 0 |

F I G. 2 8

US 10,740,562 B2

SEARCH APPARATUS, ENCODING METHOD, AND SEARCH METHOD BASED ON MORPHEME POSITION IN A TARGET DOCUMENT

CROSS-REFERENCE TO RELATED APPLICATION

This application is based upon and claims the benefit of priority of the prior Japanese Patent Application No. 2016-141598, filed on Jul. 19, 2016, the entire contents of which are incorporated herein by reference.

FIELD

The embodiments discussed herein are related to an encoding apparatus, a search apparatus, an encoding method, and a search method.

BACKGROUND

In recent years, an amount of text data has been increasing explosively, and the importance of text search has increased. In particular, the study of semantic processing for secretarial function application software or the like has become popular, and the importance of search of a semantic structure of a natural sentence has been increasing.

Lexical analysis, morphological analysis, semantic analysis, and the like are used to analyze a natural sentence used in text search. Lexical analysis is a process for dividing a character string into words, and morphological analysis is a process for dividing a character string into morphemes and assigning information such as a part of speech or an attribute to the respective morphemes. The morphemes obtained by morphological analysis may be treated as words.

Semantic analysis is a process for obtaining a semantic structure of a natural sentence by using a morphological analysis result of the natural sentence. What the natural sentence means can be expressed as data handled by computers, by using a semantic structure that is a semantic analysis result.

The semantic structure includes a plurality of semantic codes that respectively indicate the meanings of a plurality of words included in the morphological analysis result, and information indicating a connection relationship between two semantic codes. One semantic code may correspond to a plurality of words. The semantic structure can be expressed, for example, by a directed graph that is formed by a plurality of nodes indicating a plurality of semantic codes and arcs that each indicate a connection relationship between two nodes. A minimum partial structure of the semantic structure is referred to as a semantic minimum unit, and is formed by two nodes and an arc between the two nodes.

Semantic structure search for searching a plurality of documents by using a semantic structure of a search request of a natural sentence can be realized by performing morphological analysis and semantic analysis on text data included in the plurality of documents.

Patent Document 1: Japanese Laid-open Patent Publication No. 2013-186766
Patent Document 2: Japanese Laid-open Patent Publication No. 2010-93414
Patent Document 3: International Publication Pamphlet No. 2012/111078
Patent Document 4: International Publication Pamphlet No. 2011/148511
Patent Document 5: Japanese Laid-open Patent Publication No. 2012-22599
Patent Document 6: Japanese Laid-open Patent Publication No. 2012-150586

SUMMARY

According to an aspect of the embodiments, a non-transitory computer-readable recording medium stores therein an encoding program that causes a computer to execute the following process.

(1) The computer generates semantic structure information from a document. The semantic structure information includes a plurality of semantic structures in a plurality of sentences in the document and a plurality of morphemes included in each of the plurality of sentences belong to a corresponding semantic structure.

(2) The computer generates a plurality of codes by encoding the plurality of morphemes for each of the plurality of sentences.

(3) The computer specifies a specific code that corresponds to a specific morpheme from among the plurality of morphemes included in each of the plurality of sentences, wherein at least one morpheme is potentially missing in a semantic structure that the specific morpheme belongs to. The computer adds missing-portion information to the specific code for each of the plurality of sentences.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a semantic structure of a first sentence included in a document;
FIG. 11 illustrates an analysis result of a document;
FIG. 12 illustrates a connection table that corresponds to the semantic structure of the first sentence;
FIG. 13 illustrates a connection table that corresponds to the semantic structure of the second sentence;
FIG. 14 illustrates codes of arcs;
FIG. 15 illustrates semantic structure information of the first sentence;
FIG. 16 illustrates semantic structure information of the second sentence.

FIG. 22 illustrates a connection table that corresponds to the semantic structure of the search request;

FIG. 23 illustrates search request semantic structure information;

FIG. 25 illustrates semantic structure information matching processing performed on a "saba (server)" in the first sentence;

FIG. 26 illustrates semantic structure information matching processing performed on "kidoshi (start up)" in the first sentence;

FIG. 27 illustrates semantic structure information matching processing performed on "kidoshi (start up)" in the second sentence;

FIG. 28 illustrates additional information including a denial flag;

DESCRIPTION OF EMBODIMENTS

Embodiments are described below in detail with reference to the drawings.

When semantic structure search is performed on an incomplete sentence in which there is a missing portion in a semantic structure due to omission of a subject, an object, or the like, a process for complementing an omitted word, namely, a morpheme that is missing from the semantic structure needs to be performed, and therefore a calculation amount increases by the complementing process.

In a technology described in the prior Japanese Patent Application No. 2015-8936 (hereinafter referred to as a prior application technology), a document is encoded by using a series of codes formed by combining morphemes obtained by performing morphological analysis on the document with semantic codes obtained by performing semantic analysis. Consequently, a correspondence relationship between a morphological analysis result and a semantic analysis result can be effectively embedded into the encoded document, and the encoded document can be directly searched by using the semantic codes.

However, in the prior application technology, it is assumed that a sentence included in a search target document and a sentence included in a search request are complete sentences in which a subject, an object, or the like is not omitted. Accordingly, when semantic structure search is performed on an incomplete sentence in which a subject, an object, or the like is omitted, some kind of problem arises.

As an example, in a case in which the document "Pacchiwasabaniatetesaikidoshita. Suruto, kidoshinakatta. (A patch was applied to a server, and restart-up was tried. Then, the server did not start up.)" is a search target, this document includes the following two sentences.

First sentence: "Pacchiwasabaniatetesaikidoshita. (A patch was applied to a server, and restart-up was tried.)"

Second sentence: "Suruto, kidoshinakatta. (Then, did not start up.)"

FIG. 1 illustrates an example of a semantic structure of the first sentence. The first sentence includes ten morphemes, "pacchi (patch)", "wa", "saba (server)", "ni (to)", "ate (apply)", "te", "sai (re)", "kidoshi (start up)", "ta (was)", and " " Semantic codes that respectively correspond to "pacchi (patch)", "saba (server)", "ate (apply)", "sai (re)", and "kidoshi (start up)" from among these morphemes are PA001, SE001, AP001, AG001, and BO001, respectively.

A connection relationship between BO001 and AG001 is <modification>, and a connection relationship between BO001 and AP001 is <resultative>. A connection relationship between AP001 and SE001 is <goal>, and a connection relationship between AP001 and PA001 is <target>. Further, BO001 has an arc indicating <center>.

In the semantic structure of FIG. 1, "saba (server)" is not a direct object of "kidoshi (start up)". Accordingly, the first sentence does not simply match a search request of, for example, the natural sentence "Sabawosaikidosuru (A server is restarted up)".

Figure 2:
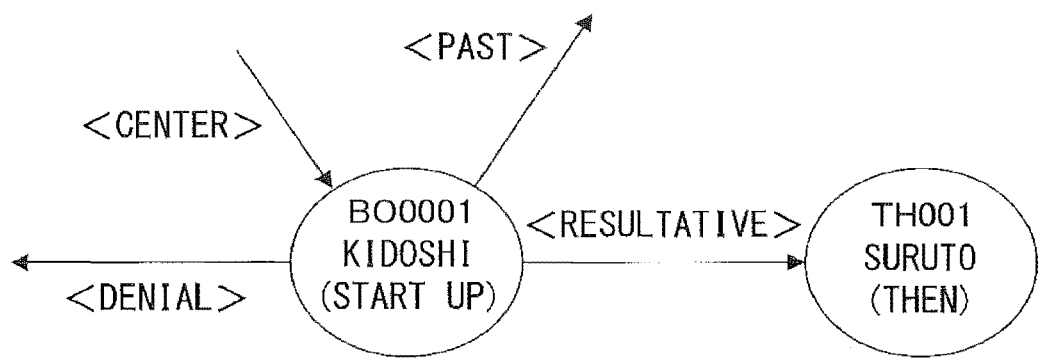
FIG. 2 illustrates a semantic structure of a second sentence included in a document.

FIG. 2 illustrates an example of a semantic structure of the second sentence. The second sentence includes five morphemes, "suruto (then)", "kidoshi (start up)", "nakat (not)", "ta (did)", and ".". Semantic codes that respectively correspond to "suruto (then)" and "kidoshi (start up)" from among these morphemes are TH001 and BO001, respectively. A connection relationship between BO001 and TH001 is <resultative>. Further, BO001 has arcs that respectively indicate <center>, <past>, and <denial>.

A subject of <kidoshi (start up) > in the second sentence is "saba (server)" in the first sentence, but the subject is omitted from the second sentence. However, a unit of semantic structure search in the prior application technology is a sentence, and therefore a subject fails to be discovered in the second sentence.

Accordingly, a method for assuming a natural sentence given as a search request in semantic structure search, and developing in advance a subject, an object, or the like included in the natural sentence in a semantic structure, is considered. However, it is very difficult to estimate in advance all variations of a search request, and even if all of the variations can be estimated, an amount of information relating to a developed semantic structure becomes enormous, and therefore this method is not realistic.

On the other hand, a method for flexibly matching a semantic structure that is a search target in accordance with a search request is also considered. In this case, an omitted subject, object, or the like is complemented by performing anaphora resolution.

Anaphora resolution is a process for identifying words and phrases that are indicated by a pronoun included in a sentence, an omitted word that is omitted from a sentence, or the like. As an example, when a subject for a verb is omitted, a word that may be the subject is searched from words that appear in sentences before the sentence. The searched word and an analysis result of the verb are verified again, and whether the searched word is the subject of the verb is determined such that the omitted subject can be identified.

However, anaphora resolution is a difficult process, and a probability of obtaining a correct analysis result is about 60-70%, and a calculation amount is enormous. Therefore, when semantic structure search and anaphora resolution are performed in parallel, resources used in processing become enormous.

Figure 3:
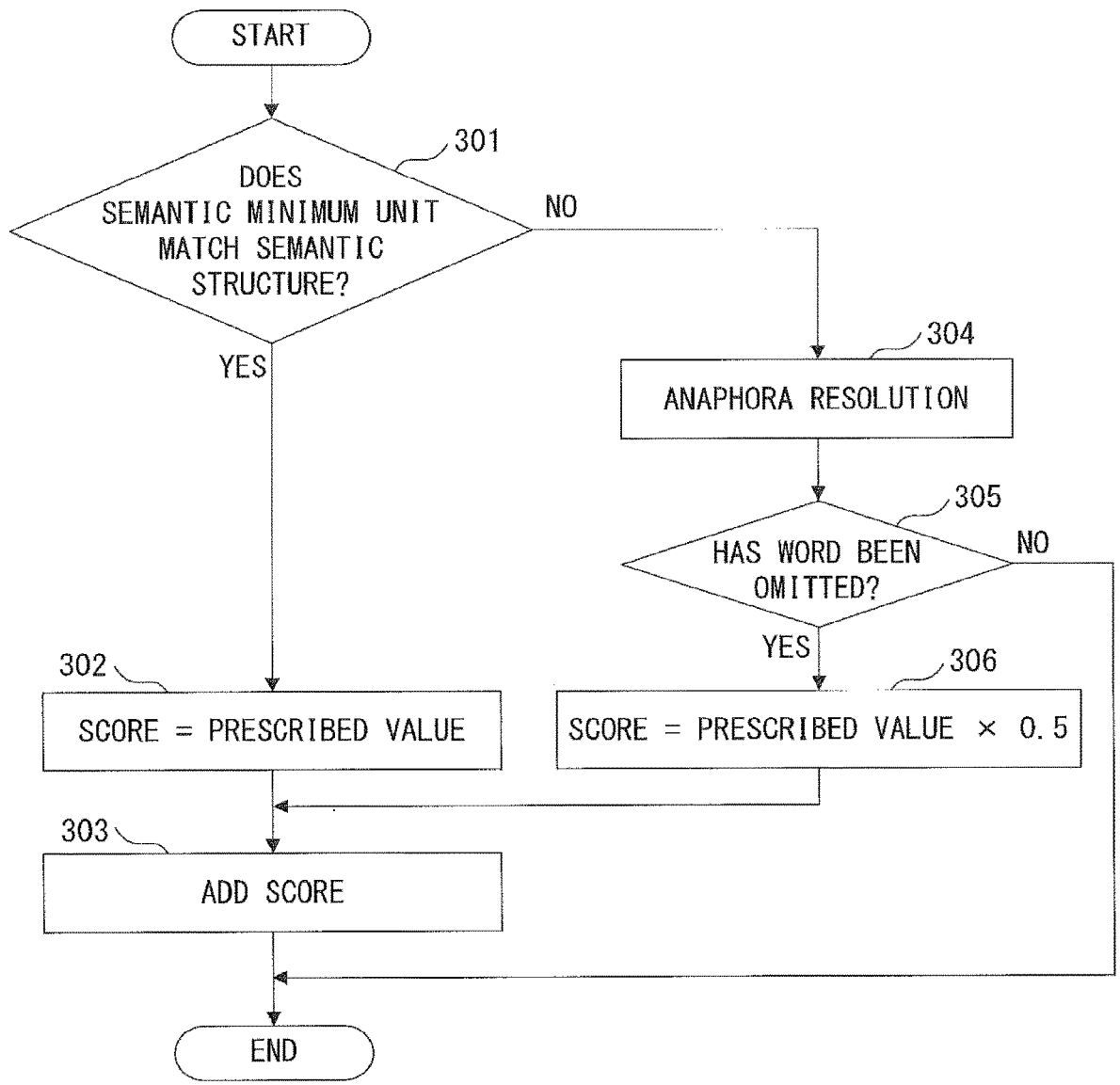
FIG. 3 is a flowchart of semantic structure search processing using anaphora resolution.

FIG. 3 is a flowchart illustrating an example of semantic structure search processing using anaphora resolution. First, a search apparatus checks whether a semantic minimum unit included in a search request matches a semantic structure of a search target document (step 301). When the semantic minimum unit matches the semantic structure of the search target document (step 301, YES), the search apparatus sets a score of the semantic minimum unit to a prescribed value (step 302), and adds the score of the semantic minimum unit to a score of the search target document (step 303).

When the semantic minimum unit does not match the semantic structure of the search target document (step 301, NO), the search apparatus performs anaphora resolution (step 304), and checks whether a word is omitted (step 305). When a word is omitted (step 305, YES), the search apparatus sets the score of the semantic minimum unit to a prescribed value×0.5 (step 306), and performs the process of step 303. When no words are omitted (step 305, NO), the search apparatus does not add the score of the semantic minimum unit, and terminates the processing.

As described above, in order to cope with a phenomenon such as omission of a subject, anaphora resolution is performed separately from matching of a search request, and a process of matching is separated from a process of anaphora resolution. When a search target document includes N semantic codes, a calculation amount of one anaphora resolution reaches the order of N×N. FIG. 3 illustrates semantic structure search in a case in which one semantic minimum unit is a search key, but several tens of search keys may be used in an actual semantic structure search. In this case, the processes of step 301 to step 306 are repeated a prescribed number of times that corresponds to the number of search keys, and a calculation amount further increases.

Figure 4:
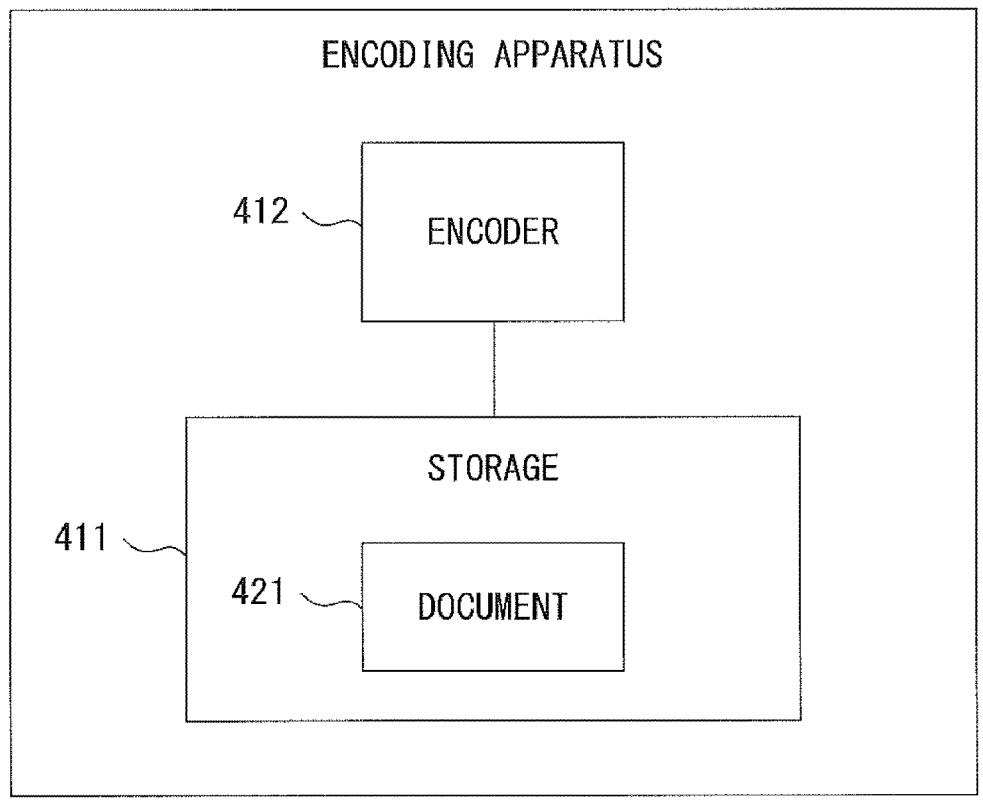
FIG. 4 is a functional block diagram of an encoding apparatus.

FIG. 4 is an example of a functional structure of an encoding apparatus according to the embodiments. An encoding apparatus 401 includes a storage 411 and an encoder 412. The storage 411 stores a document 421. The encoder 412 encodes the document 421 stored in the storage 411.

Figure 5:
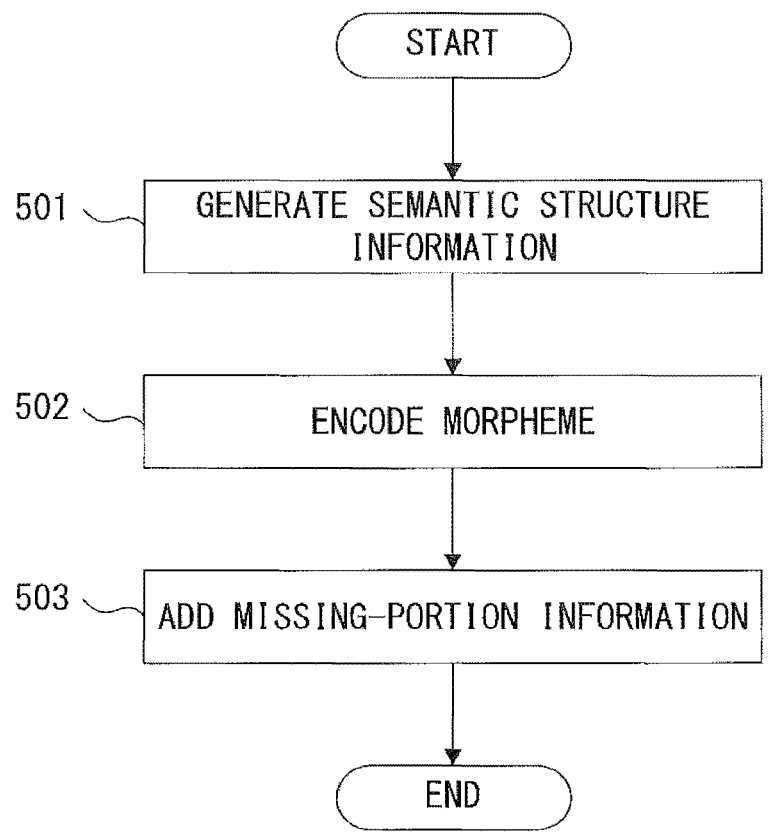
FIG. 5 is a flowchart of encoding processing.

FIG. 5 is a flowchart illustrating an example of encoding processing performed by the encoding apparatus 401 of FIG. 4. First, the encoder 412 generates semantic structure information from the document 421 (step 501). The semantic structure information includes a plurality of semantic structures in a plurality of sentences in the document 421 and a plurality of morphemes included in each of the plurality of sentences belong to a corresponding semantic structure. Then, the encoder 412 generates a plurality of codes by encoding the morphemes for each of the plurality of sentences (step 502). The encoder 412 specifies, for each of the plurality of sentences, a specific code that corresponds to a specific morpheme from among the plurality of morphemes included in each of the sentences, wherein at least one morpheme is potentially missing in a semantic structure that the specific morpheme belongs to, and the encoder 412 adds missing-portion information to the specific code for each of the sentences (step 503).

By employing the encoding apparatus 401 of FIG. 4, a processing amount of a process for complementing information relating to a morpheme that is missing from a search target document can be reduced in semantic structure search.

Figure 6:
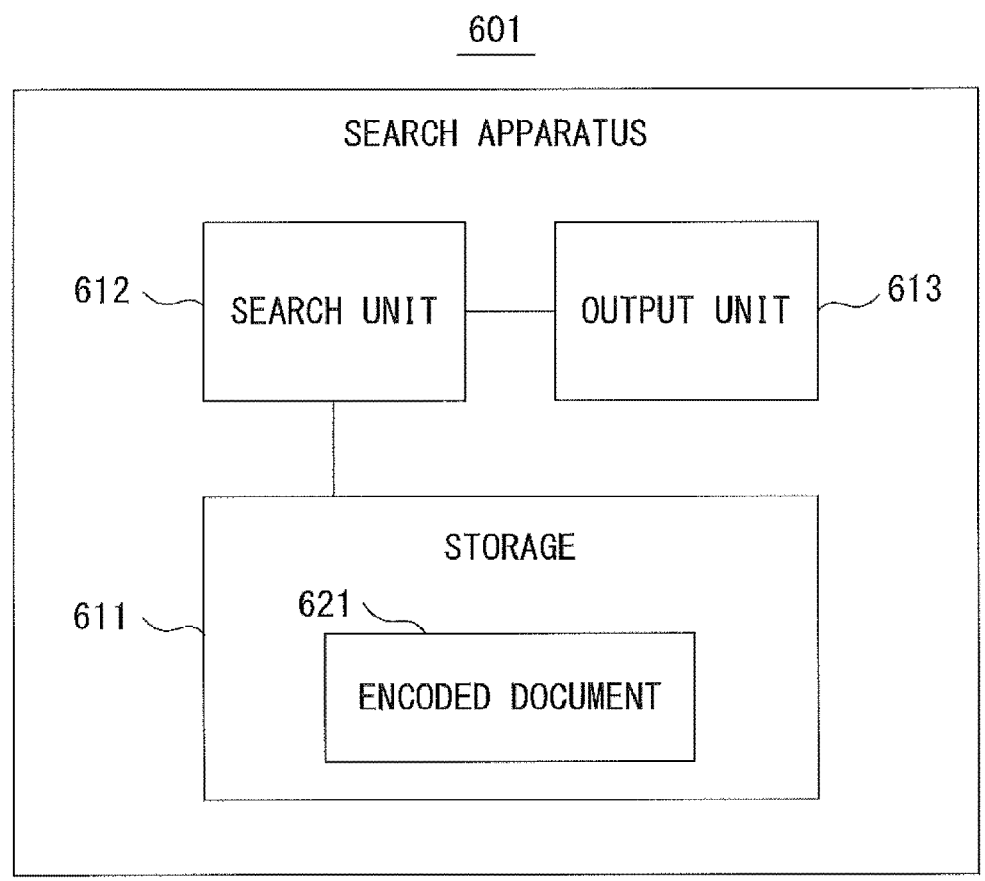
FIG. 6 is a functional block diagram of a search apparatus.

FIG. 6 is an example of a functional configuration of a search apparatus according to the embodiments. A search apparatus 601 includes a storage 611, a search unit 612, and an output unit 613. The storage 611 stores an encoded document 621 that includes search target semantic structure information, a plurality of codes, and missing-portion information.

The search target semantic structure information indicates a semantic structure that a plurality of morphemes included in a sentence belong to for each of the sentences included in a search target document. The plurality of codes are generated by encoding the morphemes for each of the sentences. The missing-portion information is added to a code that corresponds to a specific morpheme from among the plurality of morphemes included in each of the sentences, wherein at least one morpheme is potentially missing in a semantic structure that the specific morpheme belongs to.

As an example, when the document 421 of FIG. 4 is a search target document, the encoding apparatus 401 encodes the document 421 such that the encoded document 621 is generated. The search unit 612 searches the encoded document 621 stored in the storage 611 in accordance with a search request, and the output unit 613 outputs a search result.

Figure 7:
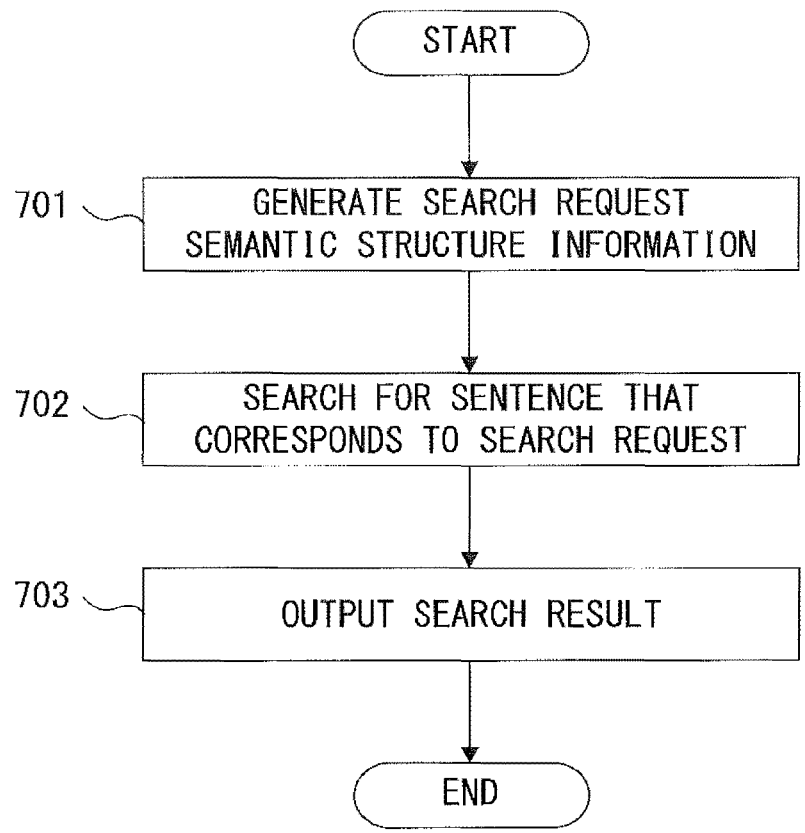
FIG. 7 is a flowchart of search processing.

FIG. 7 is a flowchart illustrating an example of search processing performed by the search apparatus 601 of FIG. 6. First, the search unit 612 generates search request semantic structure information indicating a semantic structure that a plurality of morphemes included in a search request belong to (step 701), and the search unit 612 searches for a sentence that corresponds to the search request in accordance with the search request semantic structure information (step 702). The output unit 613 outputs a search result (step 703).

By employing the search apparatus 601 of FIG. 6, a processing amount of a process for complementing information relating to a morpheme that is missing from a search target document can be reduced in semantic structure search.

Figure 8:
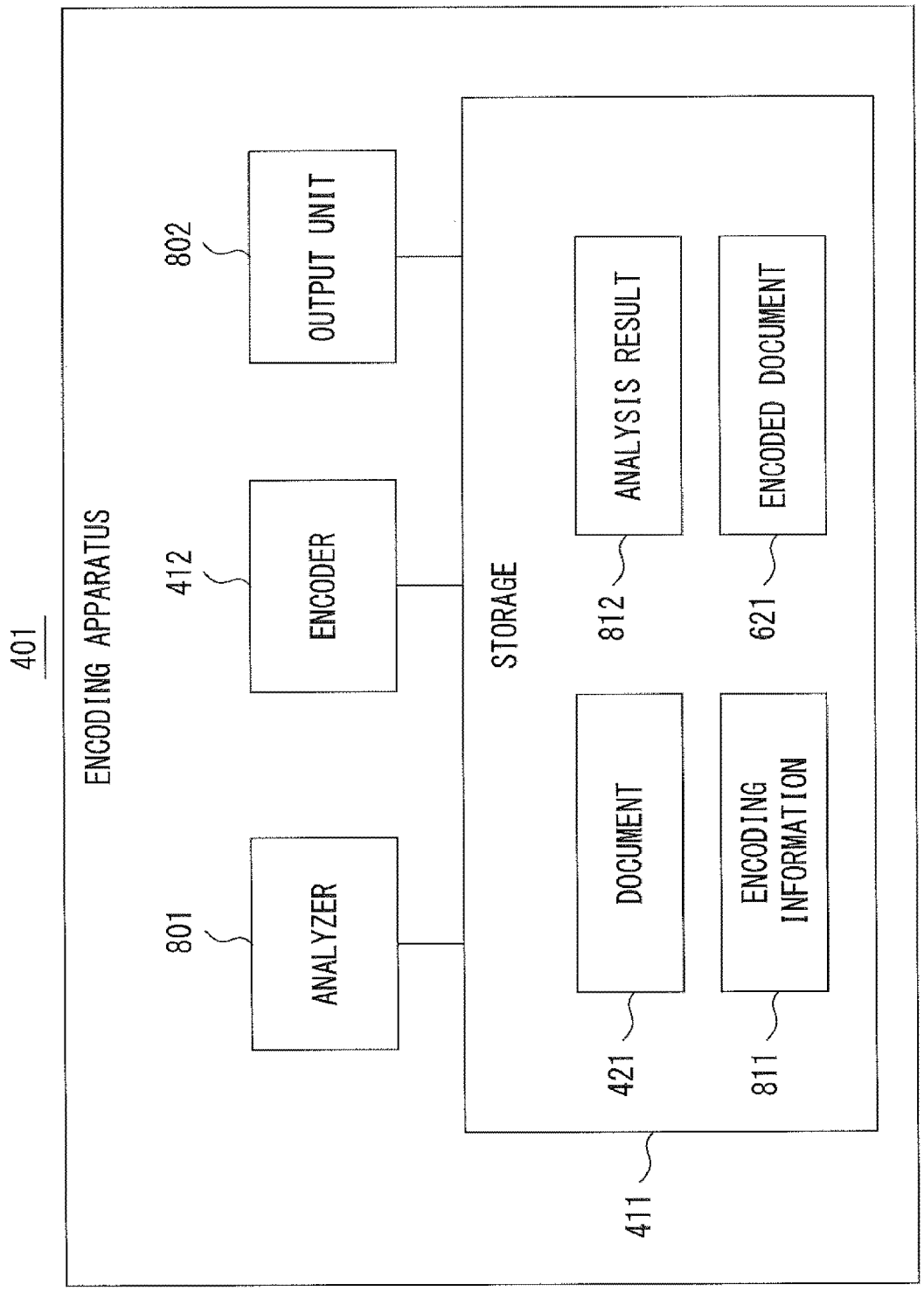
FIG. 8 is a functional block diagram illustrating a specific example of an encoding apparatus.

FIG. 8 illustrates a specific example of the encoding apparatus 401 of FIG. 4. The encoding apparatus 401 of FIG. 8 includes a storage 411, an encoder 412, an analyzer 801, and an output unit 802. The storage 411 stores a document 421 and encoding information 811. The encoding information 811 indicates a correspondence relationship between morphemes and codes, and may be referred to as an encoding dictionary.

The analyzer 801 performs morphological analysis and semantic analysis on the document 421 stored in the storage 411, generates an analysis result 812 including a morphological analysis result and a semantic analysis result, and stores the analysis result 812 in the storage 411. The encoder 412 encodes the document 421 by using the encoding information 811 and the analysis result 812 so as to generate an encoded document 621, and stores the encoded document 621 in the storage 411. The output unit 802 outputs the encoded document 621 to the search apparatus 601 of FIG. 6.

Figure 9:
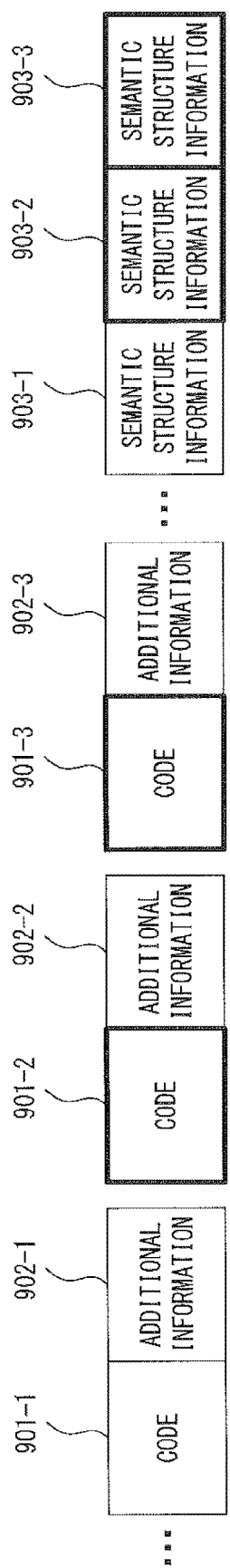
FIG. 9 illustrates an encoded document.

FIG. 9 illustrates an example of the encoded document 621. The encoded document 621 of FIG. 9 includes a code 901-1 to a code 901-N, additional information 902-1 to additional information 902-N, and semantic structure information 903-1 to semantic structure information 903-M. N indicates the number of morphemes included in the document 421, and M indicates the number of morphemes that correspond to nodes in semantic structures. Accordingly, M≤N is established.

A code 901-$i$ ($i$=1 to N) is a code that is associated with each of the morphemes by the encoding information 811, and additional information 902-$i$ is information added to each of the codes. Semantic structure information 903-$j$ ($j$=1 to M) is information indicating a semantic structure that each of the morphemes belongs to.

The codes 901-*i* are collectively arranged for each of the sentences in the document 421 in order from the first sentence to the last sentence, and the codes 901-*i* that correspond to each of the sentences are arranged in order from the first code 901-*i* of each of the sentences. After the code 901-1 to the code 901-N, the semantic structure information 903-*j* is arranged in the same order as the order of the code 901-*i*.

Figure 10:
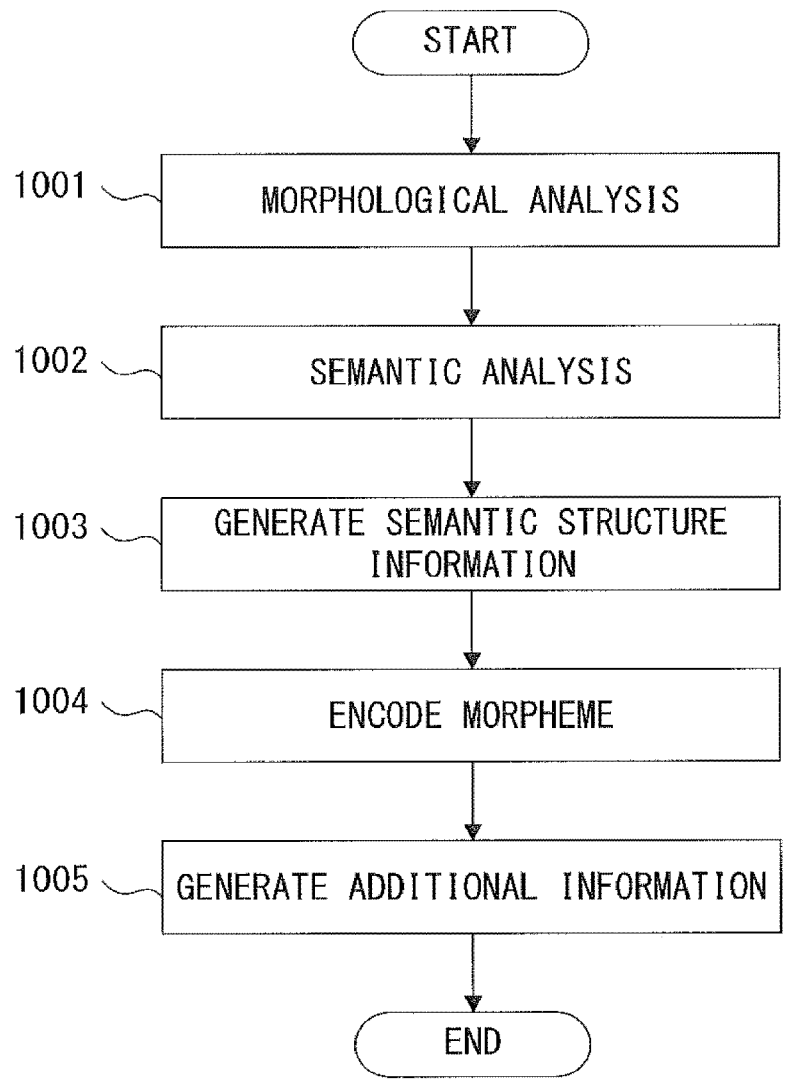
FIG. 10 is a flowchart illustrating a specific example of encoding processing.

FIG. 10 is a flowchart illustrating a specific example of encoding processing performed by the encoding apparatus 401 of FIG. 8. First, the analyzer 801 performs morphological analysis on the document 421 so as to generate a morphological analysis result (step 1001), and performs semantic analysis on the document 421 so as to generate a semantic analysis result (step 1002). The analyzer 801 stores the analysis result 812 including the morphological analysis result and the semantic analysis result in the storage 411.

Then, the encoder 412 generates semantic structure information of each morpheme included in each sentence in the document 421 (step 1003), and the encoder 412 encodes each of the morphemes by replacing each of the morphemes with a corresponding code, by using the encoding information 811 (step 1004). The encoder 412 generates additional information of each of the morphemes, and adds the additional information to the corresponding code (step 1005). Consequently, the encoded document 621 including codes, additional information, and semantic structure information is generated.

FIG. 11 illustrates an example of the analysis result 812. The analysis result 812 of FIG. 11 indicates an analysis result of the above document 421 "Pacchiwasabaniatetesaikidoshita. Suruto, kidoshinakatta. (A patch was applied to a server, and restart-up was tried. Then, did not start up.)". A sentence number is identification information of a sentence included in the document 421, and the sentence number "1" and the sentence number "2" respectively correspond to the first sentence and the second sentence. Hereinafter, the first sentence and the second sentence may be referred to as sentence 1 and sentence 2, respectively.

A position from the head of a sentence is identification information of a morpheme included in each of the sentences, and indicates what number from the head of the sentence the morpheme is. As an example, in sentence 1, "pacchi (patch)" is the first morpheme, and "saba (server)" is the third morpheme. In sentence 2, "kidoshi (start up)" is the second morpheme.

Hereinafter, a morpheme that exists in the q-th position from the head of a sentence of sentence number p may be referred to as [p, q] "morpheme". As an example, in sentence 1, "pacchi (patch)" is expressed by [1, 1] "pacchi (patch)", and "saba (server)" is expressed by [1, 3] "saba (server)". In sentence 2, "kidoshi (start up)" is expressed by [2, 2] "kidoshi (start up)".

Additional information is additional information generated in step 1005 of FIG. 10, and the additional information includes a reference flag and anaphora information. When the reference flag is the logic "1", the reference flag indicates that semantic structure information that corresponds to each morpheme exists in the encoded document 621, and when the reference flag is the logic "0", the reference flag indicates that corresponding semantic structure information does not exist.

As an example, the reference flag "1" of [1, 1] "pacchi (patch)" indicates that corresponding semantic structure information exists, and the reference flag "0" of [1, 2] "ha" indicates that corresponding semantic structure information does not exist.

The anaphora information is described in the form of "f" or "f:X" by using an anaphora flag f and position information X. When the anaphora flag f is the logic "1", the anaphora flag f indicates that a morpheme that corresponds to a semantic code of a specific morpheme that corresponds to a code appears before the specific morpheme in the document 421. In this case, the anaphora information is described in the form of "f:X", and the anaphora information includes the position information X.

The position information X is information that specifies a sentence in which the morpheme that corresponds to the semantic code appears in the document 421, and the position information X indicates that the morpheme that corresponds to the semantic code appears in a sentence that exists X sentences previously. The anaphora information "1:X" is added to the code as missing-portion information.

In addition, when the anaphora flag f is the logic "0", the anaphora flag f indicates that a morpheme that corresponds to the semantic code does not appear previously. In this case, the anaphora information is described in the form of "f", and the anaphora information "0" is added to the code as non-appearance information.

As an example, the anaphora information "0" of [1, 1] "pacchi (patch)" indicates that a morpheme that corresponds to the semantic code of "pacchi (patch)" does not appear previously. In addition, the anaphora information "1:1" of [2, 2] "kidoshi (start up)" indicates that a morpheme that corresponds to the semantic code of "kidoshi (start up)" appears one sentence previously.

In step 1003 of FIG. 10, the encoder 412 generates a connection table that corresponds to a semantic structure of each sentence, and generates semantic structure information of each morpheme according to the connection table.

FIG. 12 illustrates an example of a connection table that corresponds to the semantic structure of the first sentence illustrated in FIG. 1. Semantic codes in respective rows and respective columns in the connection table of FIG. 12 indicate nodes included in the semantic structure. Number d on a left-hand side of ":" in each cell is connection distance information indicating a connection distance between a node indicated by a row that corresponds to the cell and a node indicated by a column that corresponds to the cell. d=2 indicates that the two nodes are directly connected to each other, and d≥3 indicates that the two nodes are indirectly connected to each other via (d−2) nodes.

In addition, a character string on a right-hand side of ":" in each cell is connection relationship information indicating a connection relationship that corresponds to an arc between the two nodes. "+" at the head of a character string indicates that an arc is directed from the node indicated by the row to the node indicated by the column, and "−" indicates that an arc is directed from the node indicated by the column to the node indicated by the row. The connection relationship information is added to only a cell of d=2.

Hereinafter, a position of a cell in the connection table is expressed by using (semantic code of node indicated by row, semantic code of node indicated by column). As an example, "3:" in a cell of (SE001, PA001) indicates that SE001 (saba (server)) and PA001 (pacchi (patch)) are indirectly connected to each other via one node.

"2: −goal" in a cell of (SE001, AP001) indicates that SE001 and AP001 (ate (apply)) are directly connected by an arc indicating <goal>, and that the arc is directed from AP001 to SE001. "4:" in a cell of (SE001, AG001) indicates that SE001 and AG001 (sai (re)) are indirectly connected to each other via two nodes. "3:" in a cell of (SE001, BO001)

indicates that SE001 and BO001 (kidoshi (start up)) are indirectly connected to each other via one node.

"2: +target" in a cell of (AP001, PA001) indicates that AP001 (ate (apply)) and PA001 (pacchi (patch)) are directly connected by an arc indicating <target>, and that the arc is directed from AP001 to PA001. "2:+goal" in a cell of (AP001, SE001) indicates that AP001 and SE001 (saba (server)) are directly connected by an arc indicating <goal>, and that the arc is directed from AP001 to SE001.

"3:" in a cell of (AP001, AG001) indicates that AP001 and AG001 (sai (re)) are indirectly connected to each other via one node. "2: −resultative" in a cell of (AP001, BO001) indicates that AP001 and BO001 (kidoshi (start up)) are directly connected by an arc indicating <resultative>, and that the arc is directed from BO001 to AP001.

"3:" in a cell of (BO001, PA001) indicates that BO001 (kidoshi (start up)) and PA001 (pacchi (patch)) are indirectly connected to each other via one node. "3:" in a cell of (BO001, SE001) indicates that BO001 and SE001 (saba (server)) are indirectly connected to each other via one node.

"2:+resultative" in a cell of (BO001, AP001) indicates that BO001 and AP001 (ate (apply)) are directly connected by an arc indicating <resultative>, and that the arc is directed from BO001 to AP001. "2:+modification" in a cell of (BO001, AG001) indicates that BO001 and AG001 (sai (re)) are directly connected by an arc indicating <modification>, and that the arc is directed from BO001 to AG001.

FIG. 13 illustrates an example of a connection table that corresponds to the semantic structure of the second sentence illustrated in FIG. 2. As an example, "2:−resultative" in a cell of (TH001, BO001) indicates that TH001 (suruto (then)) and BO001 (kidoshi (start up)) are directly connected by an arc indicating <resultative>, and that the arc is directed from BO001 to TH001. "2:+resultative" in a cell of (BO001, TH001) also indicates the same information as the information of the cell of (TH001, BO001).

"Denial" in a cell of (BO001, BO001) indicates that BO001 (kidoshi (start up)) has an arc indicating <denial>. As described above, connection relationship information indicating <denial> is stored in a diagonal cell for which a row and a column correspond to the same semantic code in the connection table.

FIG. 14 illustrates examples of a code that corresponds to a connection relationship of an arc. In the example of FIG. 14, the code "1" to the code "7" are respectively allocated to <agent>, <condition>, <target>, <non-resultative>, <resultative>, <goal>, and <modification>, and the code "−1" is allocated to <denial>.

Figure 15:
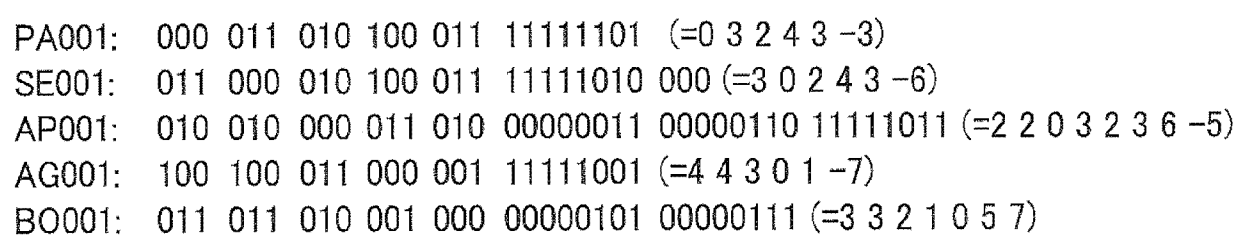

FIG. 15 illustrates an example of semantic structure information of the first sentence that is generated from the connection table of FIG. 12. The semantic structure information of FIG. 15 includes bit strings that each indicate information relating each of the rows in the connection table of FIG. 12. The bit string of each of the rows includes a prescribed number of items of 3-bit information indicating a connection distance that corresponds to the number of columns, and includes a prescribed number of items of 8-bit information indicating a connection relationship that corresponds to the number of columns for which the connection distance is 2. A connection distance of a blank cell is set to 0.

As an example, a bit string of SE001 (saba (server)) includes the 15-bit bit string "000 011 010 100 011" indicating five connection distances, and the 8-bit bit string "11111101" indicating one connection relationship.

A bit string of AP001 (ate (apply)) includes the 15-bit bit string "010 010 000 011 010" indicating five connection distances and the 24-bit bit string "00000011 00000110 11111011" indicating three connection relationships.

A bit string of BO001 (kidoshi (start up)) includes the 15-bit bit string "011 011 010 001 000" indicating five connection distances and the 16-bit bit string "00000101 00000111" indicating two connection relationships.

In the semantic structure information of FIG. 15, connection distance information of each of the cells in the connection table of FIG. 12 is expressed by 3 bits, and therefore a storage capacity for storing connection distance information of the entirety of a 5×5 connection table is 3 bits×5×5=75 bits=about 9 bytes. In addition, connection relationship information of each of the cells is expressed by 8 bits, and therefore a storage capacity for storing connection relationship information of the connection table is 1 byte×number of arcs×2=1×4×2=8 bytes. Accordingly, a storage capacity for storing semantic structure information is 9+8=17 bytes.

In contrast, in an encoded document in the prior application technology described above, a 6-bit code is allocated to one semantic minimum unit, and a code amount increases in proportion to the number of semantic minimum units. Accordingly, a storage capacity for storing five semantic minimum units that correspond to the connection table of FIG. 12 is 6 bytes×5=30 bytes.

As described above, by using the semantic structure information of FIG. 15, the same semantic structure can be stored with about 56.7% of the storage capacity in the prior application technology.

FIG. 16 illustrates an example of semantic structure information of the second sentence that is generated from the connection table of FIG. 13. A connection distance of a cell indicating <denial> is set to −1.

As an example, a bit string of TH001 (suruto (then)) includes the 6-bit bit string "000 010" indicating two connection distances and the 8-bit bit string "11111011" indicating one connection relationship. A bit string of BO001 (kidoshi (start up)) includes the 6-bit bit string "010 111" indicating two connection distances and the 16-bit bit string "00000101 11111111" indicating two connection relationships.

Figure 17:
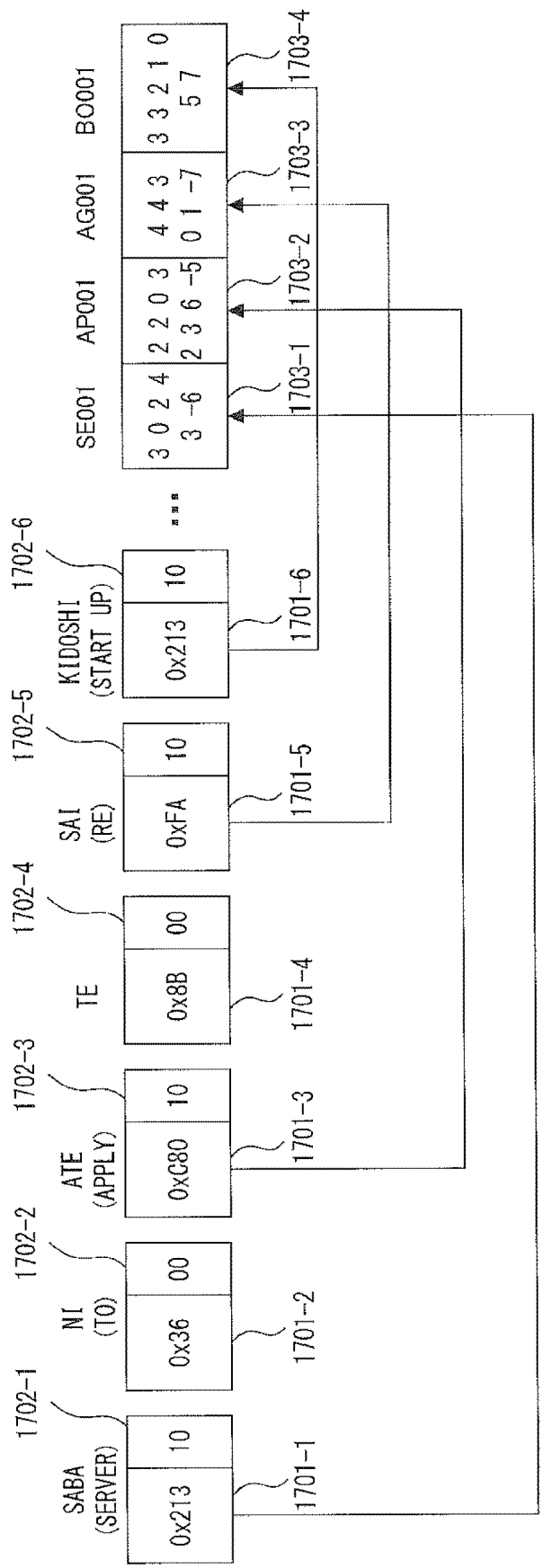
FIG. 17 illustrates a specific example of an encoded document.

FIG. 17 illustrates a specific example of the encoded document 621 generated from the document 421 "Pacchiwasabaniatetesaikidoshita. Suruto, kidoshinakatta. (A patch was applied to a server, and restart-up was tried. Then, did not start up.)". This specific example indicates codes, additional information, and semantic structure information that correspond to "sabaniatetesaikidoshi (applied to a server, and restart-up was tried)" in the first sentence, and information that corresponds to character strings before and after this, and the second sentence is omitted.

A code 1701-1 to a code 1701-6 are respectively codes that correspond to "saba (server)", "ni (to)", "ate (apply)", "te", "sai (re)", and "kidoshi (start up)". Additional information 1702-1 to additional information 1702-6 are respective pieces of additional information that are added to the code 1701-1 to the code 1701-6, and correspond to the additional information illustrated in FIG. 11.

Semantic structure information 1703-1 to semantic structure information 1703-4 are respective pieces of semantic structure information of "saba (server)", "ate (apply)", "sai (re)", and "kidoshi (start up)", and correspond to the semantic structure information illustrated in FIG. 15. Semantic structure information 1703-$j$ ($j$=1 to 4) is stored for four codes 1701-$i$ ($i$=1, 3, 5, 6) for which a reference flag of additional information 1702-$i$ is the logic "1" in the same order of the order of these four codes.

By storing additional information immediately after a code of each morpheme, as described above, whether semantic structure information will be referred to can be efficiently determined, and anaphora information can be immediately referred to, when search processing is performed. In addition, by arranging and storing codes of morphemes and semantic structure information of these morphemes in the same order, access can be performed from a code to corresponding semantic structure information at a high speed.

Semantic structure information that corresponds to each of the morphemes can be narrowed in advance to minimum information indicating a connection distance and a connection relationship between the morpheme and another morpheme, and semantic structure information can be accessed from any morpheme that belongs to a semantic structure.

Figure 18:
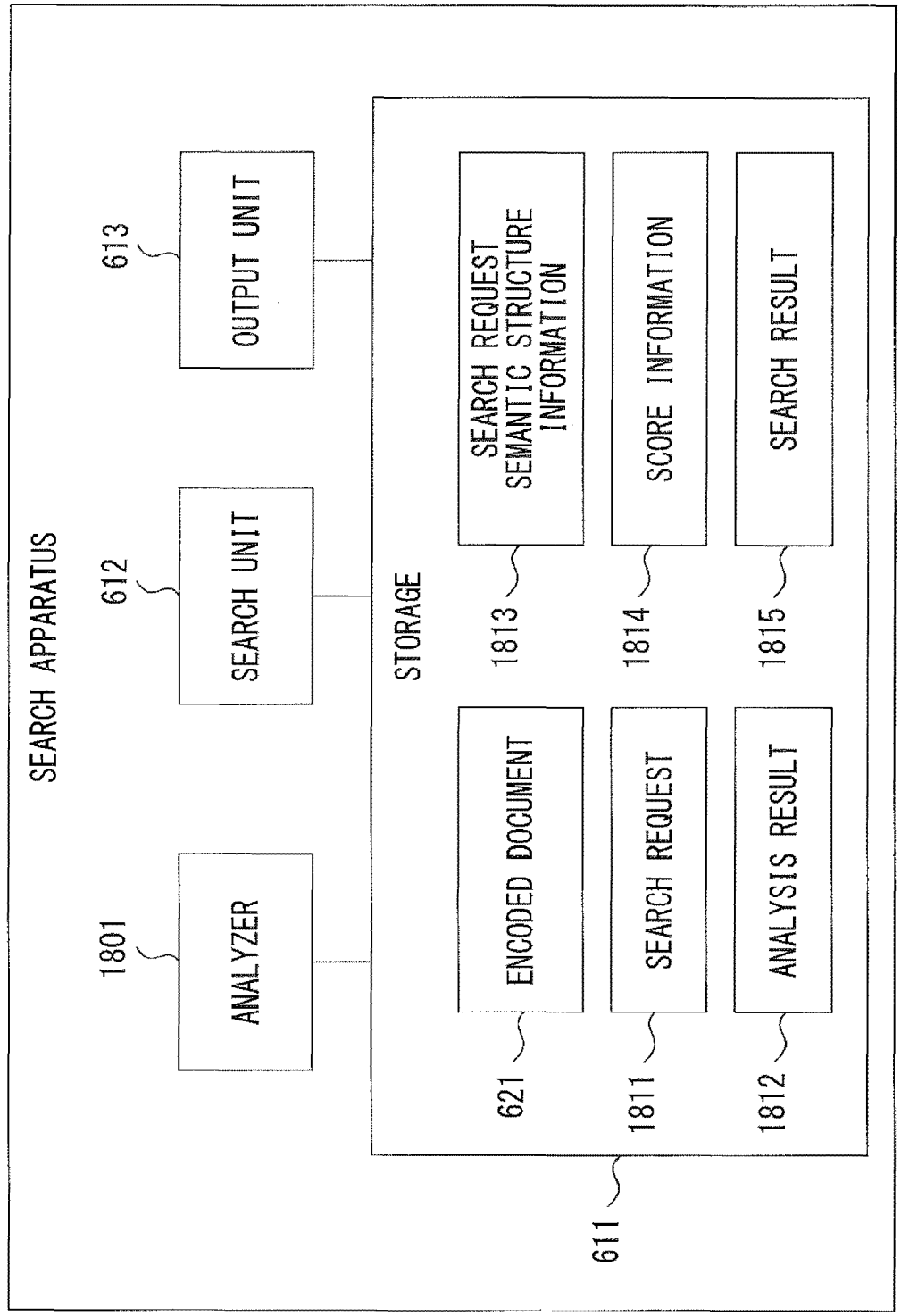
FIG. 18 is a functional block diagram illustrating a specific example of a search apparatus.

FIG. 18 illustrates a specific example of the search apparatus of FIG. 6. The search apparatus 601 of FIG. 18 includes a storage 611, a search unit 612, an output unit 613, and an analyzer 1801. The storage 611 stores the encoded document 621 that is output from the encoding apparatus 401 of FIG. 8.

When a user inputs a search request 1811 of a natural sentence, the search unit 612 receives the input search request 1811, and stores the search request 1811 in the storage 611. The analyzer 1801 performs morphological analysis and semantic analysis on the search request 1811, generates an analysis result 1812 including a morphological analysis result and a semantic analysis result, and stores the analysis result 1812 in the storage 611.

The search unit 612 generates search request semantic structure information 1813 indicating a semantic structure of the search request 1811 by using the analysis result 1812, and stores the search request semantic structure information 1813 in the storage 611. In addition, the search unit 612 generates score information 1814 indicating a score of a combination of two morphemes included in the search request 1811, by using the analysis result 1812, and stores the score information 1814 in the storage 611. The search unit 612 searches the encoded document 621 by using the analysis result 1812 and the search request semantic structure information 1813, generates a search result 1815, and stores the search result 1815 in the storage 611. The output unit 613 outputs the search result 1815.

Figure 19:
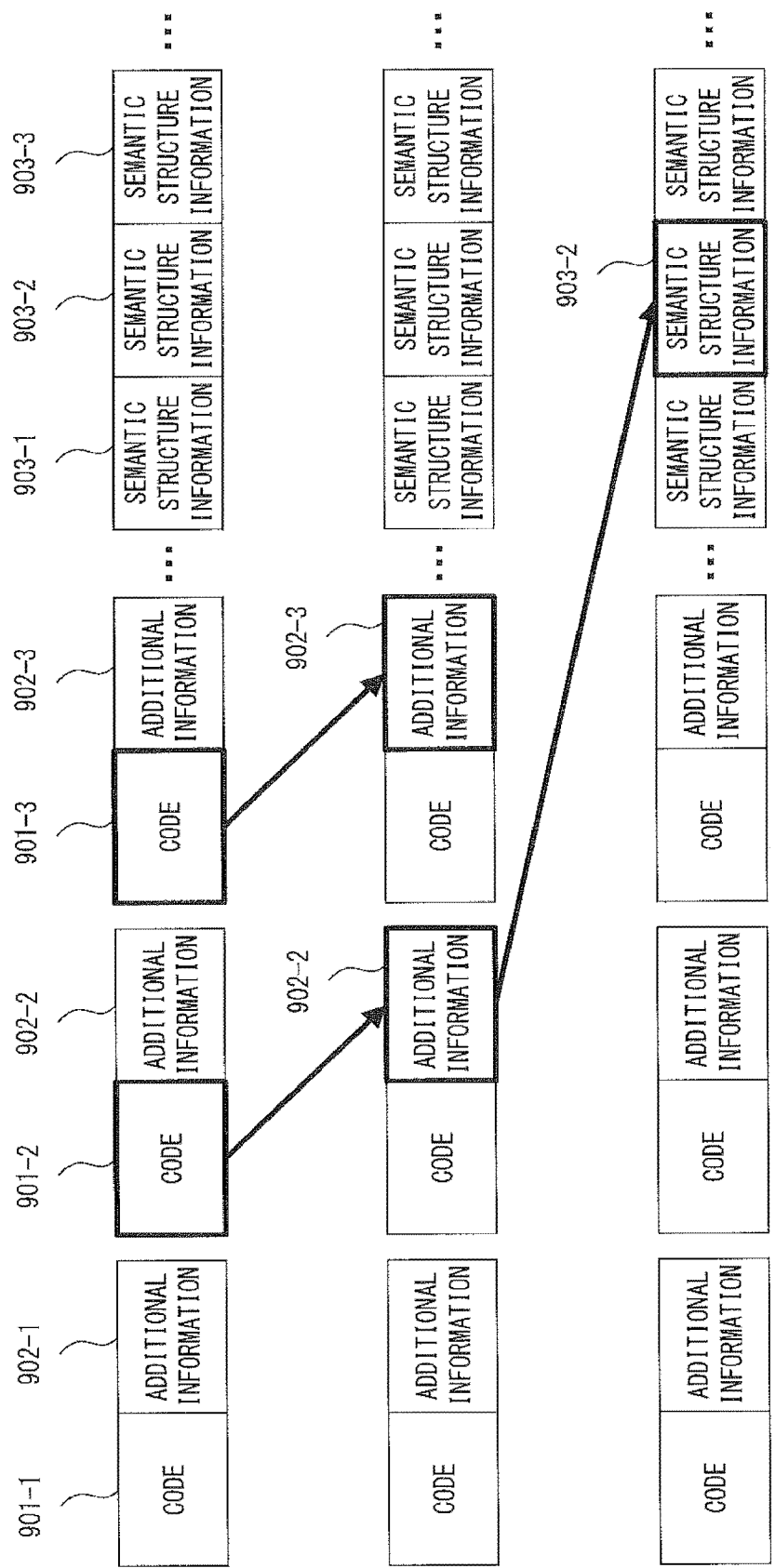
FIG. 19 illustrates search processing.

FIG. 19 illustrates an example of search processing performed on the encoded document 621 of FIG. 9. In this case, semantic structure information 903-1 to semantic structure information 903-M correspond to search target semantic structure information.

First, the search unit 612 searches for codes of morphemes included in the search request 1811 in order from the head of the encoded document 621, and a code 901-2 and a code 901-3 match codes of the search request 1811. Therefore, the search unit 612 refers to additional information 902-2 and additional information 902-3 added to the code 901-2 and the code 901-3.

When a reference flag of the additional information 902-2 is the logic "1" and a reference flag of the addition information 902-3 is the logic "0", the search unit 612 refers to semantic structure information 903-2 that corresponds to the code 901-2. The search unit 612 checks whether the semantic structure of the search request 1811 matches a semantic structure that a morpheme that corresponds to the code 901-2 belongs to, by comparing the search request semantic structure information 1813 and the semantic structure information 903-2.

Then, the search unit 612 calculates a score of the search request 1811 with respect to the semantic structure that the morpheme that corresponds to the code 901-2 belongs to, by using the score information 1814, and generates a search result 1815 by using the calculated score.

In this case, even when a semantic code of a morpheme that corresponds to the code 901-1 is included in the semantic structure that the morpheme that corresponds to the code 901-2 belongs to, the search unit 612 does not need to refer to the semantic structure information 903-1 that corresponds to the code 901-1.

In the search processing described above, high-speed morpheme matching is performed first, and semantic structure information matching for which a calculation amount is large is performed on only matching morphemes, without performing search in accordance with only a semantic structure. Consequently, a load of search processing is reduced.

Figure 20:
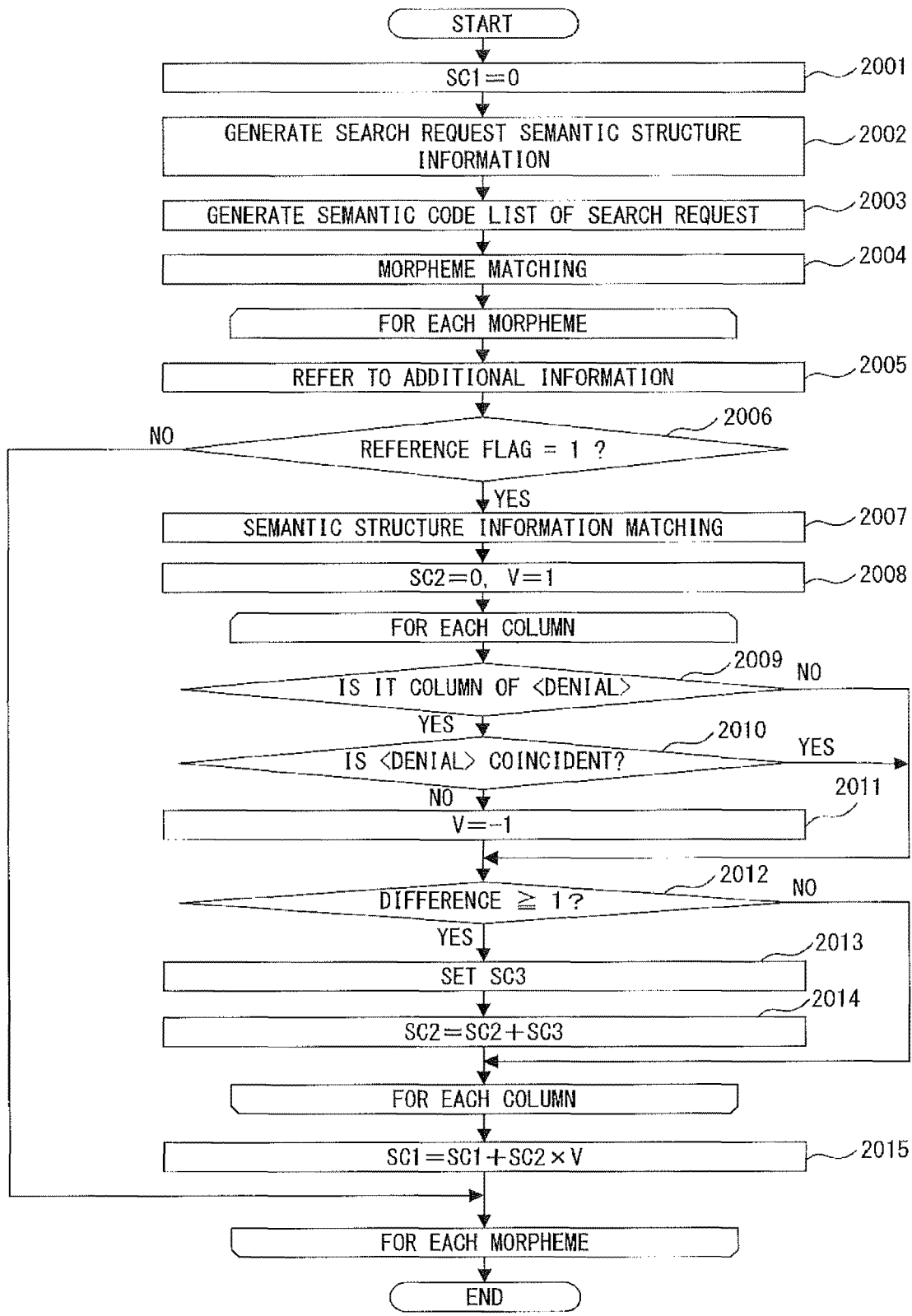
FIG. 20 is a flowchart illustrating a specific example of search processing.

FIG. 20 is a flowchart illustrating a specific example of search processing performed by the search apparatus 601 of FIG. 18. First, the search unit 612 sets a score SC1 of the encoded document 621 to 0 (step 2001). Then, the search unit 612 generates a connection table that corresponds to the semantic structure of the search request 1811 by using the analysis result 1812, and generates the search request semantic structure information 1813 on the basis of the connection table (step 2002).

Figure 21:
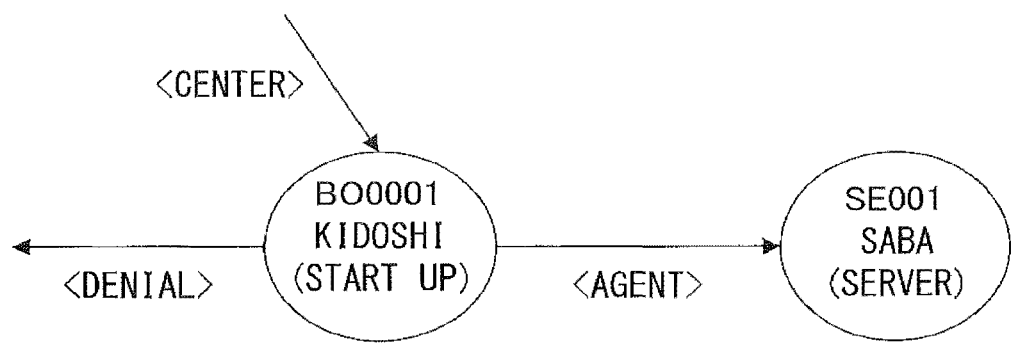
FIG. 21 illustrates a semantic structure of a search request.

FIG. 21 illustrates an example of the semantic structure of the search request 1811. The semantic structure of FIG. 21 corresponds to the search request 1811 "Sabagakidoshinai. (A server does not start up.)". This search request 1811 includes five morphemes, "saba (server)", "ga", "kidoshi (start up)", "nai (not)", and".". Semantic codes that correspond to "saba (server)" and "kidoshi (start up)" from among these morphemes are "SE001" and "BO001", respectively. A connection relationship between "BO001" and "SE001" is <agent>. Further, "BO001" has arcs indicating <center> and <denial>.

FIG. 22 illustrates an example of a connection table that corresponds to the semantic structure of FIG. 21. The connection table of FIG. 22 includes connection distance information and connection relationship information, similarly to the connection tables of the document 421 illustrated in FIG. 12 and FIG. 13. However, the definition of a connection distance of the search request 1811 is different from the definition of the connection distance of the document 421. In the connection table of the search request 1811, a connection distance d indicating that two nodes are directly connected to each other is used, and d=1 is set.

In semantic structure information matching, two connection distances are compared by subtracting the connection distance of the search request 1811 between the same two nodes from the connection distance of the document 421. At this time, by using "1" indicating direct connection as the connection distance of the search request 1811, the difference "1" indicating direct connection can be obtained by subtracting "1" from d when the connection distance d of the document 421 is "2" indicating direct connection.

When the connection distance d of the document 421 is a value that is greater than or equal to "3" indicating indirect connection, a difference greater than or equal to "2" that indicates indirect connection can be obtained by subtracting "1" from d. How far two nodes are away from each other in the semantic structure of the document 421 can be calculated from the obtained difference.

As an example, "1:–agent" in a cell of (SE001, BO001) indicates that SE001 (saba (server)) and BO001 (kidoshi (start up)) are directly connected by an arc indicating <agent>, and that the arc is directed from BO001 to SE001. "1: +agent" in a cell of (BO001, SE001) also indicates the same information as the information of the cell of (SE001, BO001).

In addition, "denial" in a cell of (BO001, BO001) indicates that BO001 (kidoshi (start up)) has an arc indicating <denial>. A connection distance of the cell indicating <denial> is set to −1.

FIG. 23 illustrates an example of the search request semantic structure information 1813 generated from the connection table of FIG. 22. As an example, a bit string of SE001 (saba (server)) includes the 6-bit bit string "000 001" indicating two connection distances and the 8-bit bit string "11111111" indicating one connection relationship. A bit string of BO001 (kidoshi (start up)) includes the 6-bit bit string "001 111" indicating two connection distances and the 16-bit bit string "00000001 11111111" indicating two connection relationships.

After generating the search request semantic structure information 1813, the search unit 612 generates a semantic code list of the search request 1811 that indicates a plurality of semantic codes included in the connection table of the search request 1811 (step 2003). The respective semantic codes included in the semantic code list of the search request 1811 correspond to respective columns of the connection table indicated by the search request semantic structure information 1813.

Then, the search unit 612 replaces respective morphemes included in the search request 1811 with corresponding codes by using information that is similar to the encoding information 811 of FIG. 8, and performs morpheme matching by using the codes (step 2004). In morpheme matching, the search unit 612 searches for the codes of the respective morphemes included in the search request 1811 from the encoded document 621.

Assume a case in which morpheme matching is performed on the encoded document 621 of the document 421 illustrated in FIG. 11 by using the search request 1811 "Sabagakidoshinai. (A server does not start up.)". In this case, [1, 3] "saba (server)" matches "saba (server)" in the search request 1811, and [1, 8] "kidoshi (start up)" and [2, 2] "kidoshi (start up)" match "kidoshi (start up)" in the search request 1811. In addition, [2, 3] "nakat (not)" matches "nai (not)" in the search request 1811.

After performing morpheme matching, the search unit 612 repeats the processes of step 2005 to step 2015 for each of the morphemes that correspond to matching codes. First, the search unit 612 refers to additional information added to a matching code (step 2005), and checks its reference flag (step 2006).

When the reference flag is the logic "1" (step 2006, YES), the search unit 612 refers to semantic structure information that corresponds to the code, and performs semantic structure information matching (step 2007). In semantic structure information matching, the search unit 612 calculates a difference in a connection distance between the referred semantic structure information and the search request semantic structure information 1813 for a column that is common to a connection table indicated by the referred semantic structure information and the connection table indicated by the search request semantic structure information 1813.

When the reference flag is the logic "0" (step 2006, NO), the search unit 612 repeats the process of step 2005 and the processes that follow for the next morpheme.

In the document 421 illustrated in FIG. 11, reference flags of [1, 3] "saba (server)", [1, 8] "kidoshi (start up)", and [2, 2] "kidoshi (start up)" are the logic "1", and therefore, semantic structure information matching is performed on these morphemes. On the other hand, a reference flag of [2, 3] "nakat (not)" is the logic "0", and therefore, semantic structure information matching is not performed on this morpheme.

Figure 24:
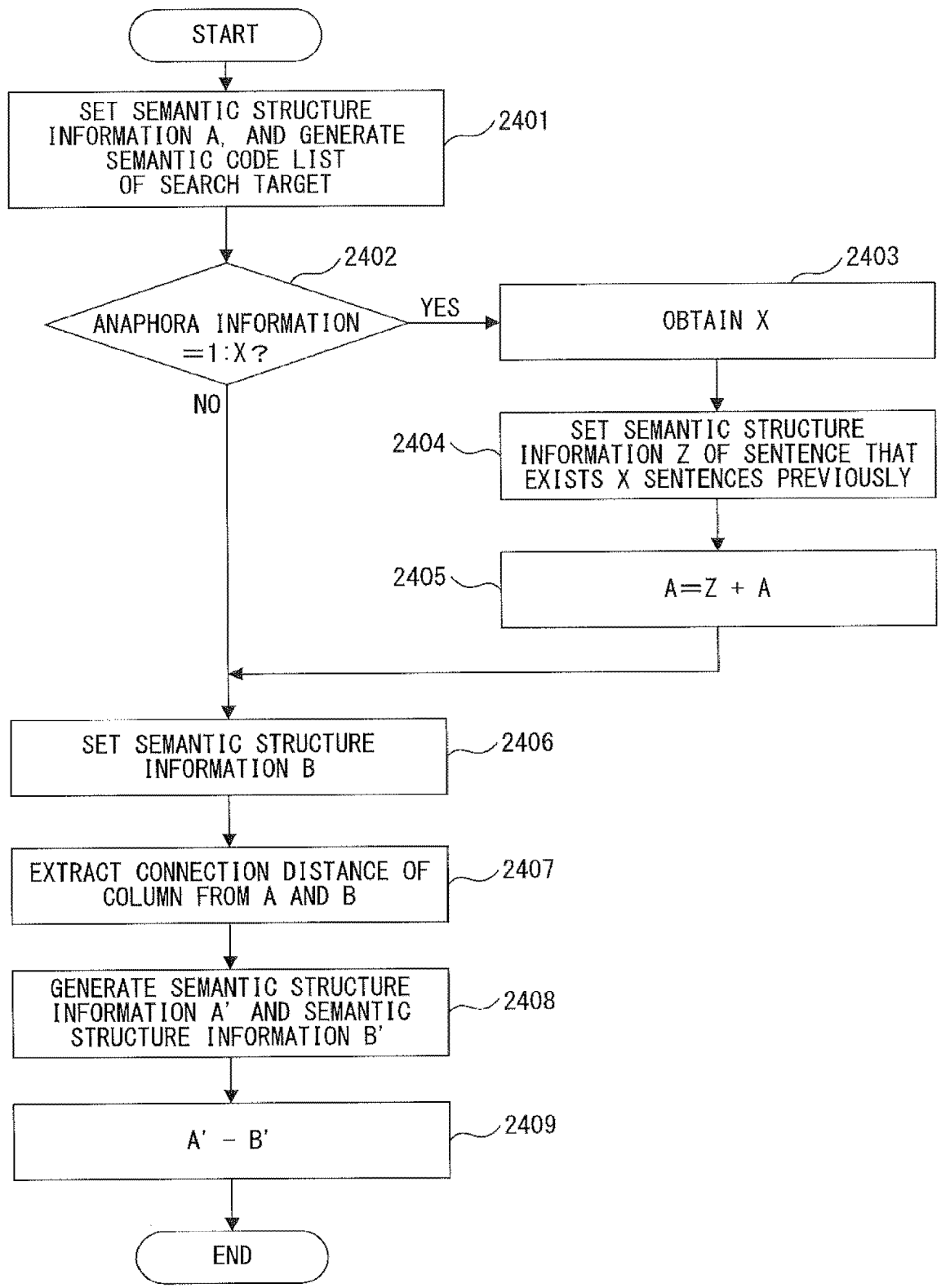
FIG. 24 is a flowchart of semantic structure information matching processing.

FIG. 24 is a flowchart illustrating an example of semantic structure information matching processing in step 2007 of FIG. 20. First, the search unit 612 obtains semantic structure information that corresponds to a matching code from the encoded document 621, and sets the semantic structure information to be semantic structure information A (step 2401).

In addition, the search unit 612 extracts a plurality of codes to which a reference flag of the logic "1" is added from a sentence including a morpheme that corresponds to the matching code. The search unit 612 replaces respective morphemes that correspond to these codes with semantic codes so as to generate a semantic code list of a search target. The respective semantic codes included in the semantic code list of the search target correspond to respective columns of a connection table indicated by the semantic structure information A.

Then, the search unit 612 refers to additional information added to the matching code, and checks its anaphora information (step 2402). When an anaphora flag included in the anaphora information is the logic "0" (step 2402, NO), the search unit 612 extracts semantic structure information that corresponds to the matching code from the search request semantic structure information 1813, and sets the semantic structure information to be semantic structure information B (step 2406).

The search unit 612 specifies a semantic code that is common to the semantic code list of the search request 1811 and the semantic code list of the search target, and extracts connection distances of columns that correspond to the specified semantic code from the semantic structure information A and the semantic structure information B (step 2407). Then, the search unit 612 generates semantic structure information A' and semantic structure information B' that include only the columns that corresponds to the common semantic code by using the extracted connection distances (step 2408).

The search unit 612 subtracts a connection distance of the semantic structure information B' from a connection distance of the semantic information A' for each of the columns of the semantic structure information A' and the semantic structure information B', and generates a difference in a connection distance (step 2409).

When the anaphora flag f included in the anaphora information is the logic "1" (step 2402, YES), the search unit 612 obtains position information X from the anaphora information (step 2403). The search unit 612 specifies a code of a morpheme that corresponds to the semantic code of a morpheme that corresponds to the matching code from among codes included in a sentence that exists X sentences previous to a sentence that corresponds to the matching code in the encoded document 621 (step 2404). The search unit 612 obtains semantic structure information that corresponds to the specified code, and sets the semantic structure information to be semantic structure information Z.

The search unit 612 extracts a plurality of codes to which a reference flag of the logic "1" is added from the sentence that exists X sentences previously, and replaces respective morphemes that correspond to these codes with semantic codes so as to generate a semantic code list of the sentence that exists X sentences previously.

The search unit 612 updates the semantic structure information A by merging the semantic structure information Z and the semantic structure information A, and updates the semantic code list of the search target by merging the semantic code list of the sentence that exists X sentences previously and the semantic code list of the search target (step 2405). The search unit 612 performs the process of step 2406 and the processes that follow.

FIG. 25 illustrates an example of semantic structure information matching processing performed on [1, 3] "saba (server)" in the first sentence. First, a bit string of SE001 that corresponds to [1, 3] "saba (server)" in the semantic structure information of the first sentence illustrated in FIG. is set in the semantic structure information A. Five semantic codes included in the semantic structure information of the first sentence are set in the semantic code list of the search target (a semantic code list of A). In this case, an anaphora flag f of [1, 3] "saba (server)" is the logic "0", and therefore the semantic structure information A and the semantic code list of A are not updated.

In addition, a bit string of SE001 that corresponds to "saba (server)" in the search request semantic structure information 1813 illustrated in FIG. 23 is set in the semantic structure information B. Two semantic codes included in the search request semantic structure information 1813 are set in the semantic code list of the search request 1811 (a semantic code list of B).

In this case, SE001 in the second column of the semantic code list of A matches SE001 in the first column of the semantic code list of B, and BO001 in the fifth column of the semantic code list of A matches BO001 in the second column of the semantic code list of B.

Accordingly, connection distances in the second column and the fifth column are extracted from the semantic structure information A, and the bit string "000 011" indicating the semantic structure information A' is generated by using these connection distances. In addition, connection distances in the first column and the second column are extracted from the semantic structure information B, and the bit string "000 001" indicating the semantic structure information B' is generated by using these connection distances.

The bit string "000 010" indicating a difference in a connection distance is generated by subtracting a connection distance of each of the columns of the semantic structure information B' from the connection distance of each of the columns of the semantic structure information A'. "010" of the second column of this bit string indicates the connection distance "2". Accordingly, it is understood that a semantic structure in which SE001 and BO001 included in the search request 1811 are indirectly connected to each other exists in the first sentence.

FIG. 26 illustrates an example of semantic structure information matching processing performed on [1, 8] "kidoshi (start up)" in the first sentence. First, a bit string of BO001 that corresponds to [1, 8] "kidoshi (start up)" in the semantic structure information of the first sentence illustrated in FIG. 15 is set in the semantic structure information A. Five semantic codes included in the semantic structure information of the first sentence are set in the semantic code list of A. In this case, an anaphora flag f of [1, 8] "kidoshi (startup)" is the logic "0", and therefore the semantic structure information A and the semantic code list of A are not updated.

In addition, a bit string of BO001 that corresponds to "kidoshi (startup)" in the search request semantic structure information 1813 illustrated in FIG. 23 is set in the semantic structure information B. Two semantic codes included in the search request semantic structure information 1813 are set in the semantic code list of B.

In this case, SE001 in the second column of the semantic code list of A matches SE001 in the first column of the semantic code list of B, and BO001 in the fifth column of the semantic code list of A matches BO001 in the second column of the semantic code list of B.

Accordingly, connection distances of the second column and the fifth column are extracted from the semantic structure information A, and the bit string "011 000" indicating the semantic structure information A' is generated by using these connection distances. In addition, connection distances of the first column and the second column are extracted from the semantic structure information B, and the bit string "001 111" indicating the semantic structure information B' is generated by using these connection distances. "111" of the second column of this bit string indicates −1, which is a connection distance of <denial>.

The bit string "010 001" indicating a difference in a connection distance is generated by subtracting a connection distance of each of the columns of the semantic structure information B' from a connection distance of each of the columns of the semantic structure information A'. "010" of the first column of this bit column indicates the connection distance "2", and "001" of the second column indicates that a connection distance of the second column of the semantic structure information A' is not −1 and does not correspond to <denial>. Accordingly, it is understood that a semantic structure in which SE001 and BO001 included in the search request 1811 are indirectly connected to each other exists in the first sentence, but that <denial> is not coincident.

Figure 27:
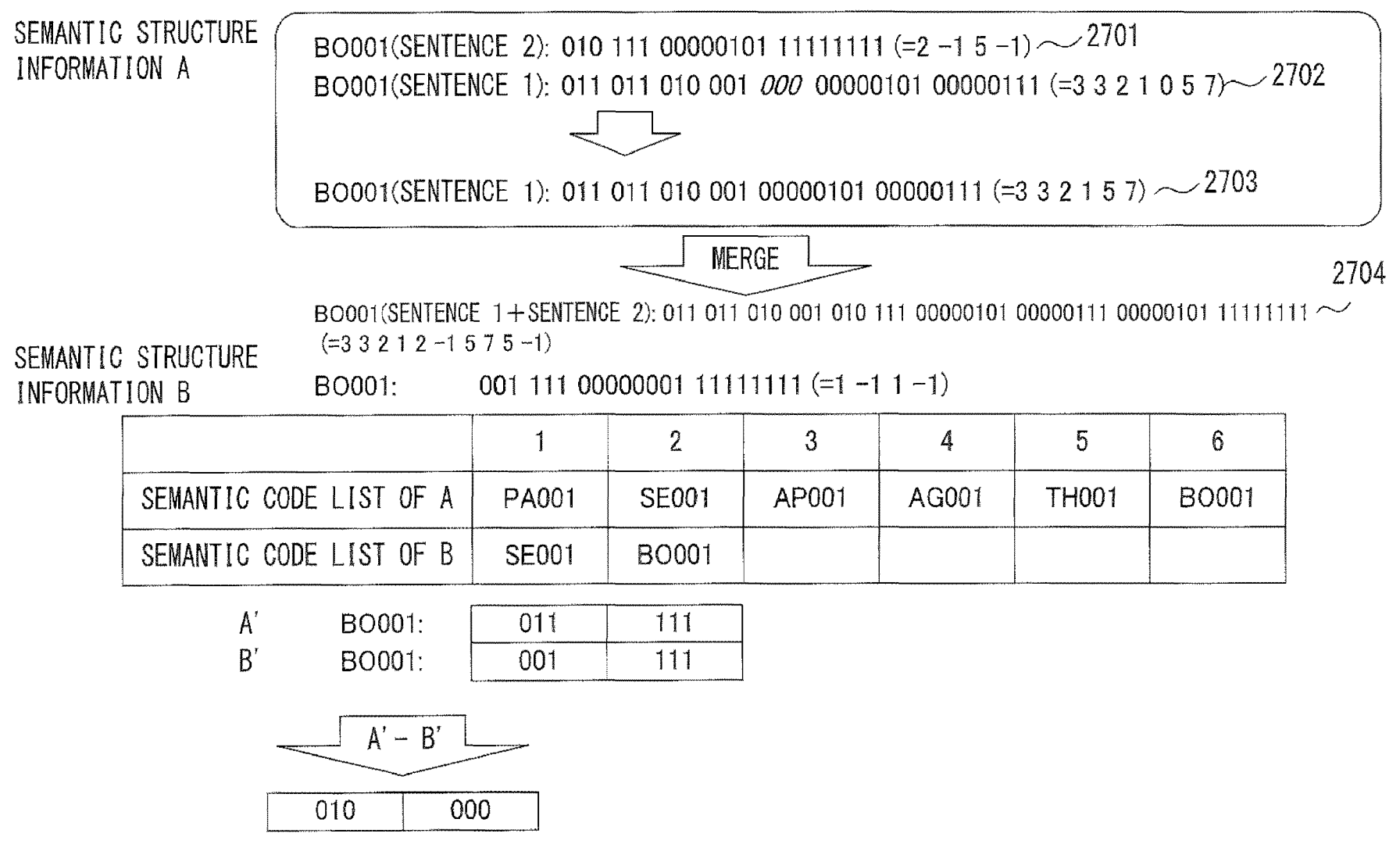

FIG. 27 illustrates an example of semantic structure information matching processing performed on [2, 2] "kidoshi (start up)" in the second sentence (sentence 2). First, a bit string 2701 of BO001 that corresponds to [2, 2] "kidoshi (start up)" in the semantic structure information of sentence 2 illustrated in FIG. 16 is set in the semantic structure information A. Two semantic codes included in the semantic structure information of sentence 2 are set in the semantic code list of A.

In this case, an anaphora flag f of [2, 2] "kidoshi (start up)" is the logic "1", and the position information X is 1, and therefore, [1, 8] "kidoshi (start up)" that corresponds to BO001 is specified from among morphemes included in sentence 1 that exists one sentence previous to sentence 2. A bit string 2702 of BO001 that corresponds to [1, 8] "kidoshi (start up)" in the semantic structure information of sentence 1 illustrated in FIG. 15 is set in the semantic structure information Z, and five semantic codes included in the semantic structure information of sentence 1 are set in the semantic code list of sentence 1.

Then, the semantic structure information A is updated by merging the semantic structure information Z and the semantic structure information A. At this time, a semantic code that corresponds to "000" illustrated in italics of the fifth column of the bit string 2702 is BO001, and overlaps a semantic code that corresponds to "010" of the second column of the bit string 2701. Accordingly, "000" of the fifth column of the bit string 2702 is deleted, a bit string 2703 is generated, and a bit string 2704 is generated by merging the bit string 2703 and the bit string 2701. Consequently, the semantic structure information A is updated to the bit string 2704.

In addition, the semantic code list of A is updated by merging the semantic code list of sentence 1 and the semantic code list of A. At this time, BO001 that is duplicately included in the two semantic code lists is deleted from the semantic code list of sentence 1, and semantic codes of sentence 1 excluding BO001 are merged into the semantic code list of A. Accordingly, the updated semantic code list of A is "PA001, SE001, AP001, AG001, TH001, BO001".

In addition, a bit string of BO001 that corresponds to "kidoshi (start up)" in the search request semantic structure information 1813 illustrated in FIG. 23 is set in the semantic structure information B. Two semantic codes included in the search request semantic structure information 1813 are set in the semantic code list of B.

In this case, SE001 in the second column of the semantic code list of A matches SE001 in the first column of the semantic code list of B, and BO001 in the sixth column of the semantic code list of A matches BO001 in the second column of the semantic code list of B.

Accordingly, connection distances of the second column and the sixth column are extracted from the semantic structure information A, and the bit string "011 111" indicating the semantic structure information A' is generated by using these connection distances. "111" of the second column of this bit string indicates the −1 that is a connection distance of <denial>. In addition, connection distances of the first column and the second column are extracted from the semantic structure information B, and the bit string "001 111" indicating the semantic structure information B' is generated by using these connection distances. "111" of the second column of this bit string also indicates the −1 that is the connection distance of <denial>.

The bit string "010 000" indicating a difference in a connection distance is generated by subtracting a connection distance of each of the strings of the semantic structure information B' from a connection distance of each of the columns of the semantic structure information A'. "010" of the first column of this bit string indicates the connection distance "2", and "000" of the second column indicates that both of the second columns of the semantic structure information A' and the semantic structure information B' correspond to <denial>. Accordingly, it is understood that a semantic structure in which SE001 and BO001 included in the search request 1811 are indirectly connected to each other exists in sentence 2, and that <denial> is coincident.

After performing semantic structure information matching, the search unit 612 sets a score SC2 of a matching code in morphological matching to 0, and sets a coefficient V of the score SC2 to 1 (step 2008). Then, the search unit 612 repeats the processes of step 2009 to step 2014 for each column for which a difference in a connection distance has been calculated.

First, the search unit 612 checks whether a column to be processed is a column indicating a result of subtraction using the connection distance of <denial> (a column of <denial>) (step 2009). When the column to be processed is a column of <denial> (step 2009, YES), the search unit 612 checks whether <denial> is coincident from a result of subtraction for the column (step 2010). When <denial> is coincident (step 2010, YES), the search unit 612 does not change the coefficient V. When <denial> is not coincident (step 2010, NO), the search unit 612 changes the coefficient V to −1 (step 2011).

Then, the search unit 612 compares a difference of the column to be processed with 1 (step 2012). When the difference is greater than or equal to 1 (step 2012, YES), the search unit 612 obtains, from the score information 1814, a score of a combination of a morpheme that corresponds to the matching code in morphological matching and a morpheme that corresponds to the column to be processed (step 2013). The search unit 612 sets SC3 to the obtained score.

The search unit 612 adds SC3 to SC2, sets SC2 to an addition result (step 2014), and repeats the process of step 2009 and the processes that follow by using the next column as a column to be processed. When the column to be processed is not a column of <denial> (step 2009, NO), the search unit 612 performs the process of step 2012 and the processes that follow. When the difference is smaller than or equal to 0 (step 2012, NO), the search unit 612 repeats the process of step 2009 and the processes that follow by using the next column as a column to be processed.

After the processes of step 2009 to step 2014 are performed on all of the columns, the search unit 612 adds the product of SC2 and the coefficient V to SC1, and sets SC1 to an addition result (step 2015). The search unit 612 repeats the process of step 2005 and the processes that follow for the next morpheme. After the processes of step 2005 to step 2015 are performed on all of the morphemes, the search unit 612 stores the score SC1 as the search result 1815 in the storage 611, and terminates the processing.

By repeating the processes of step 2009 to step 2014 on each of the columns, the score SC3 of the combination is added to the score SC2 of the matching code for a plurality of morphemes that are connected to a morpheme that corresponds to the matching code in the search request 1811. In addition, by repeating the processes of step 2005 to step 2015 for each of the morphemes, the score SC2 is added to the score SC1 of the encoded document 621 for a plurality of matching codes. At this time, the score SC2 is subtracted from the score SC1 for a semantic structure in which <denial> is not coincident.

The score SC1 calculated above indicates a degree of similarity between the semantic structure of the search request 1811 and the semantic structure of the encoded document 621. Accordingly, as the score SC1 increases, a semantic structure included in the encoded document 621 is more similar to the semantic structure of the search request 1811.

A score S of a combination of two morphemes that is included in the score information 1814 can be calculated, for example, according to the following expression.

$$S=\mathrm{idf1}*N1+\mathrm{idf2}*N2 \qquad (1)$$

idf1 indicates an inverse document frequency of the first morpheme included in the combination, and idf2 indicates an inverse document frequency of the second morpheme. N1 indicates the number of appearances of the first morpheme in the search request 1811, and N2 indicates the number of appearances of the second morpheme in the search request 1811.

The score S of a combination of two morphemes can also be calculated according to the following expression instead of expression (1).

$$S=\mathrm{idf11}*N11+\mathrm{idf12}*N12 \qquad (2)$$

idf11 indicates an inverse document frequency of a semantic code that corresponds to the first morpheme included in the combination, and idf12 indicates an inverse document frequency of a semantic code that corresponds to the second morpheme. N11 indicates the number of appearances of the semantic code that corresponds to the first morpheme in the search request 1811, and N12 indicates the number of appearances of the semantic code that corresponds to the second morpheme in the search request 1811.

As an example, in the case of the bit string "000 010" indicating a difference in a connection distance of FIG. 25, "010" of the second column indicates the connection distance "2", and therefore a score S (SE001, BO001) of a combination of SE001 and BO001 is set in SC2. S (SE001, BO001) is added to SC1.

In contrast, in the case of the bit string "010 001" indicating a difference in a connection distance of FIG. 26, "010" of the first column indicates the connection distance "2", and therefore the score S (SE001, BO001) is set in SC2. However, <denial> of the second column is not coincident, and therefore S (SE001, BO001) is multiplied by −1, and a multiplication result is added to SC1.

In addition, in the case of the bit string "010 000" indicating a difference in a connection distance of FIG. 27, "010" of the first column indicates the connection distance "2", and therefore a score S (SE001, BO001) is set in SC2. Because <denial> of the second column is coincident, S (SE001, BO001) is added to SC1 with no change.

In step 2014 of FIG. 20, the search unit 612 may update SC2 by using a difference D in a connection distance in accordance with the following expression.

$$SC2=SC2+SC3\times(1/D) \quad (3)$$

Consequently, in the case of D=1 indicating a direct connection, SC3 is added to SC2 with no change. In the case of D>1 indicating an indirect connection, the product of SC3 and 1/D is added to SC2. Accordingly, as the connection distance decreases, SC2 increases, and a score SC1 of the encoded document 621 also increases.

When encoded documents 621 that correspond to documents 421 are given as search targets, the search unit 612 performs the search processing of FIG. 20 on each of the encoded documents 621. Consequently, a score SC1 is calculated for each of the encoded documents 621.

By performing the search processing of FIG. 20, even when a sentence included in the document 421 as the search target is incomplete, a sentence similar to the search request 1811 can be searched. At this time, morpheme matching and semantic structure information matching are integrated by including additional information and semantic structure information in the encoded document 621. Therefore, unless all variations of the search request 1811 are assumed in advance and are developed into semantic structures, a load of anaphora resolution can be greatly reduced, and score calculation can be performed at a higher speed.

In a case in which N morphemes are included in the document 421, a calculation amount of a process for complementing information relating to a missing morpheme only reaches the order of N in both the encoding processing of FIG. 10 and the search processing of FIG. 20. In the encoding processing, anaphora resolution is performed using the morphemes, and therefore the calculation amount is proportional to N. In the search processing, semantic structure information is referred to only when anaphora information added to a matching code includes the position information X, and therefore the calculation amount is proportional to N. Accordingly, a higher-speed semantic structure search can be achieved than the semantic structure search processing of FIG. 3 for which the calculation amount reaches the order of N×N.

Meanwhile, in the encoded document 621, information relating to an arc indicating <denial> can be included as a denial flag in additional information, instead of including the information relating to the arc indicating <denial> in the semantic structure information.

FIG. 28 illustrates an example of additional information including a denial flag. The denial flag of FIG. 28 indicates whether a semantic structure of a morpheme that corresponds to each code has an arc indicating <denial> in the encoded document 621 of the document 421 of FIG. 11. In this example, BO001 that is a semantic code of [2, 2] "kidoshi (start up)" has the arc indicating <denial>, as illustrated in FIG. 2, and therefore the logic "1" is set for a denial flag of [2, 2] "kidoshi (start up)".

In this case, a connection distance indicating <denial> is not set in the semantic structure information of the second sentence illustrated in FIG. 16. Accordingly, "111" of the second column of a bit string of BO001 (kidoshi (start up)) is changed to "000". In the search processing of FIG. 20, the search unit 612 refers to the denial flag, and determines a value of the coefficient V instead of performing the processes of step 2009 to step 2011.

Figure 29:
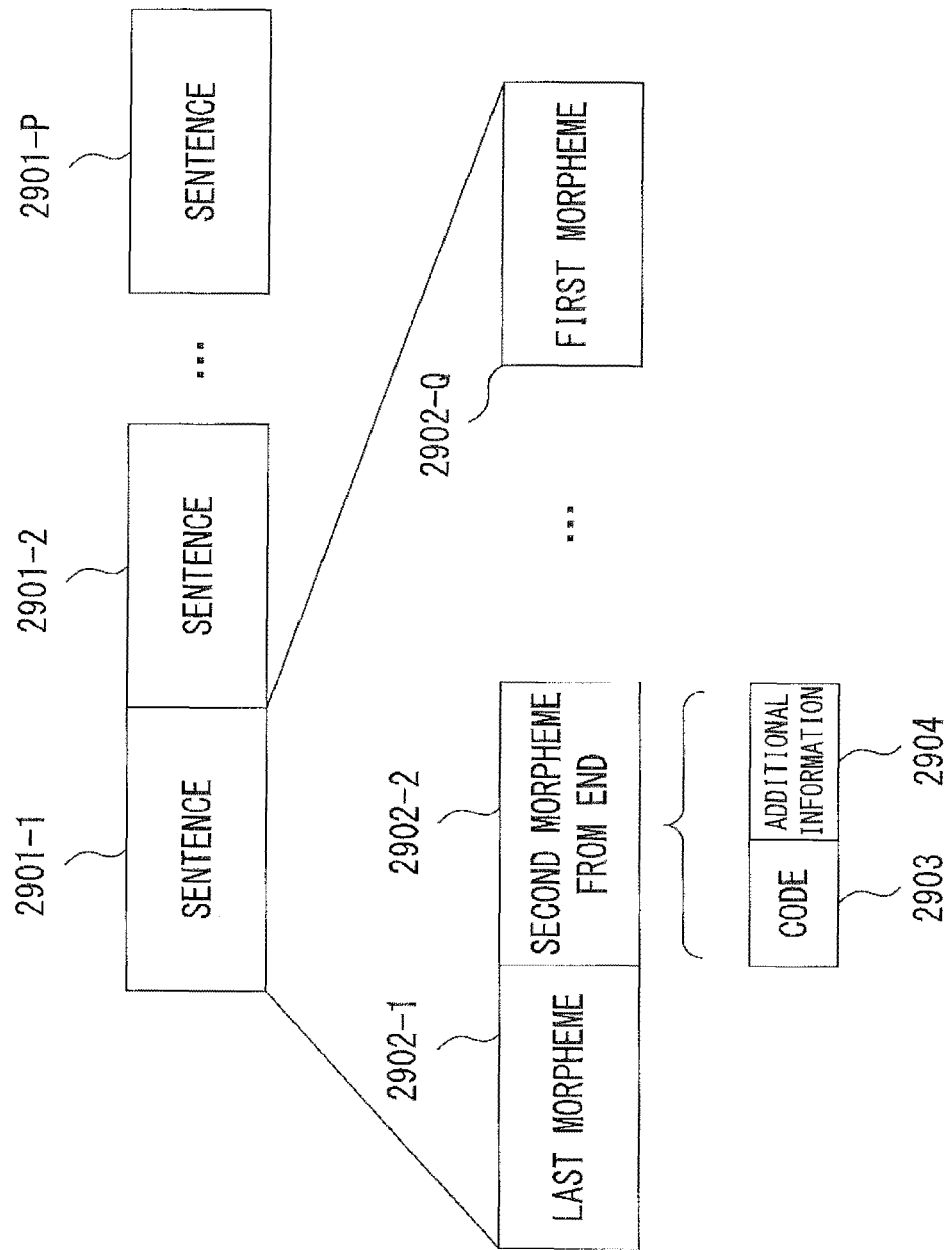
FIG. 29 illustrates an encoded document in which codes are arranged in order from the end of a sentence.

FIG. 29 illustrates an example of the encoded document 621 in which codes are arranged in order from the end of a sentence. In the encoded document 621 of FIG. 29, codes are collectively arranged for each of P sentences in the document 421 in order from the first sentence 2901-1 to the last sentence 2901-P. A code 2903 and additional information 2904 are arranged for each of Q morphemes included in each of the sentences in order from the last morpheme 2902-1 to the first morpheme 2902-Q. In this case, semantic structure information that corresponds to each of the codes 2903 is also arranged in the same order of the codes 2903.

Arrangement of codes in FIG. 29 is particularly effective for a language in which a morpheme connected to a large number of morphemes appears near the end of a sentence. As an example, in the case of Japanese, Korean, or the like, a verb connected to nouns or the like often appears near the end of a sentence. In the document 421 illustrated in FIG. 11, [1, 8] "kidoshi (start up)" corresponds to such a verb.

In this case, by arranging codes in order from the end of a sentence, semantic structure information of a morpheme connected to a large number of morphemes can be referred to, and semantic structure search can be performed at an early stage of search processing. Consequently, a score SC1 of the encoded document 621 that is close to the final score can be obtained at an early stage.

Figure 30A:
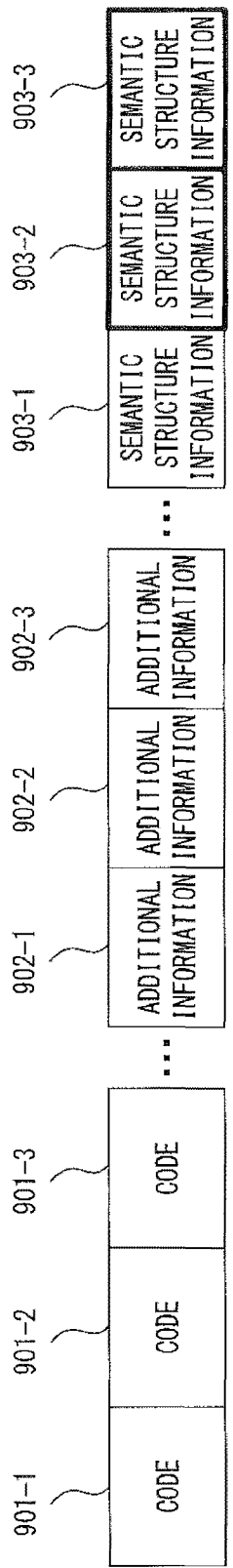
FIG. 30A and FIG. 30B illustrate encoded documents in which additional information is arranged after a series of codes.
Figure 30B:
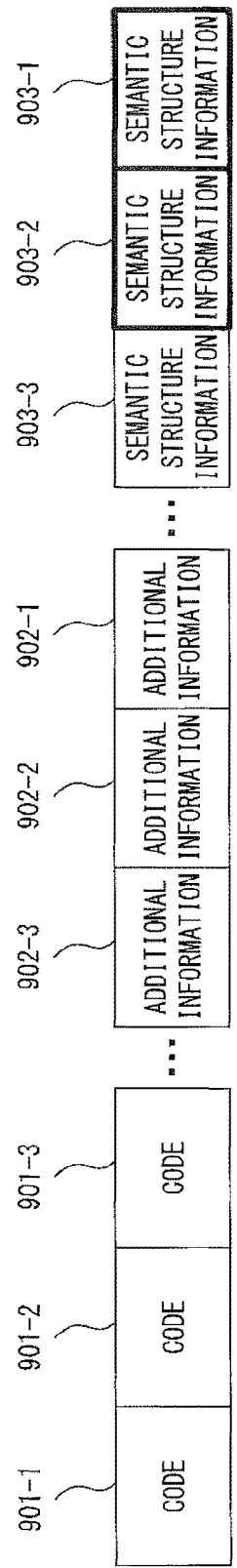

FIG. 30A and FIG. 30B illustrate examples of the encoded document 621 in which additional information is arranged after a series of codes. In the encoded document 621 of FIG. 30A, additional information 902-1 to additional information 902-N are arranged after the code 901-1 to the code 901-N of FIG. 9 in the same order as the order of a code 901-*i*. Semantic structure information 903-1 to semantic structure information 903-M are arranged after the additional information 902-1 to the additional information 902-N in the same order as the order of the code 901-*i*.

In contrast, in the encoded document 621 of FIG. 30B, the additional information 902-N to the additional information 902-1 are arranged after the code 901-1 to the code 901-N of FIG. 9 in the order reverse to the order of the code 901-*i*. The semantic structure information 903-M to semantic structure information 903-1 are arranged after the additional information 902-N to the additional information 902-1 in the order reverse to the order of the code 901-*i*.

Also, when the encoded document 621 of FIG. 29, FIG. 30A, or FIG. 30B is used, semantic structure search can be performed at a high speed while referring to additional information and semantic structure information.

The configurations of the encoding apparatus 401 of FIG. 4 and FIG. 8 are examples, and some components may be omitted or changed according to the purposes or conditions of the encoding apparatus 401. As an example, when the analysis result 812 is generated by an external apparatus, the analyzer 801 of FIG. 8 can be omitted.

The configurations of the search apparatus 601 of FIG. 6 and FIG. 18 are examples, and some components may be omitted or changed according to the purposes or conditions of the search apparatus 601. As an example, when the analysis result 812 is generated by an external apparatus, the analyzer 1801 of FIG. 18 can be omitted. The encoder 412 and the analyzer 801 of FIG. 8 may be added to the search apparatus 601, and encoding processing may be performed in the search apparatus 601.

The flowcharts of FIG. 3, FIG. 5, FIG. 7, FIG. 10, FIG. 20, and FIG. 24 are examples, and some processes may be omitted or changed according to the configuration or conditions of the encoding apparatus 401 or the search apparatus 601. As an example, in the encoding processing of FIG. 10, when the analysis result 812 is generated by an external apparatus, the processes of step 1001 and step 1002 can be omitted.

In the search processing of FIG. 20, when a score of the encoded document 621 is not calculated, the processes of step 2008 to step 2015 can be omitted. In this case, a result of the semantic structure information matching processing in step 2007 is stored as the search result 1815 in the storage 611.

The semantic structures of FIG. 1, FIG. 2, and FIG. 21, the encoded documents of FIG. 9, FIG. 17, FIG. 29, FIG. 30A, and FIG. 30B, the analysis results and the additional information of FIG. 11 and FIG. 28, the connection tables of FIG. 12, FIG. 13, and FIG. 22, the arcs and the codes of FIG. 14, and the semantic structure information of FIG. 15, FIG. 16, and FIG. 23 are examples. Information having another data structure may be used according to the configuration or conditions of the encoding apparatus 401 or the search apparatus 601. In addition, the content of each piece of information changes according to the content of the document 421 and the search request 1811. The language of the document 421 and the search request 1811 may be a language other than Japanese, such as English, Chinese, or Korean.

The search processing of FIG. 19 and the semantic structure information matching processing of FIG. 25 to FIG. 27 are examples, and the content of each processing changes according to the content of the document 421 and the search request 1811. Expression (1) to expression (3) are examples, and the score S or the score SC2 may be calculated according to another expression.

Figure 31:
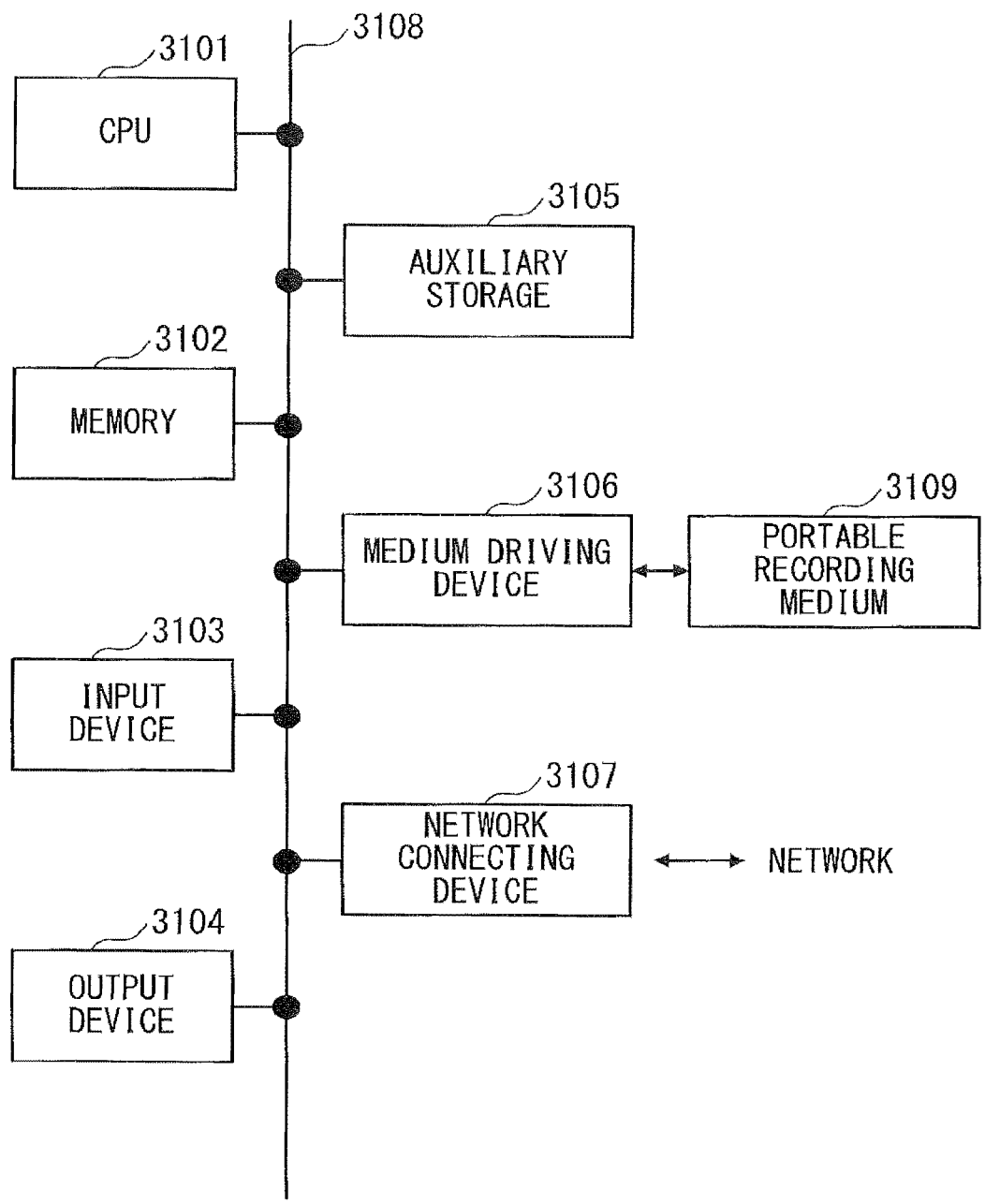
FIG. 31 is a block diagram of an information processing apparatus.

FIG. 31 illustrates an exemplary configuration of an information processing apparatus (a computer) used as the encoding apparatus 401 of FIG. 4 or FIG. 8 or the search apparatus 601 of FIG. 6 or FIG. 18. The information processing apparatus of FIG. 31 includes a central processing unit (CPU) 3101, a memory 3102, an input device 3103, an output device 3104, an auxiliary storage 3105, a medium driving device 3106, and a network connecting device 3107. These components are connected to each other via a bus 3108.

The memory 3102 is a semiconductor memory such as a read only memory (ROM), a random access memory (RAM), or a flash memory, and the memory 3102 stores a program and data used in processing. The memory 3102 can be used as the storage 411 of FIG. 4 or FIG. 8 or the storage 611 of FIG. 6 or FIG. 18.

The CPU 3101 (a processor) operates as the encoder 412 and the analyzer 801 of FIG. 4 and FIG. 8 by executing a program by using, for example, the memory 3102. The CPU 3101 also operates as the search unit 612 and the analyzer 1801 of FIG. 6 and FIG. 18 by executing a program by using the memory 3102.

The input device 3103 is, for example, a keyboard, a pointing device, or the like, and the input device 3103 is used to input an instruction and information from an operator or a user. The input information may be the search request 1811.

The output device 3104 is, for example, a display device, a printer, a speaker, or the like, and the output device 3104 is used to output an inquiry or an instruction to an operator or a user, and a processing result. The output device 3104 can be used as the output unit 613 of FIG. 6 or FIG. 18. The processing result may be the search result 1815.

The auxiliary storage 3105 is, for example, a magnetic disk device, an optical disk device, a magneto-optical disk device, a tape device, or the like. The auxiliary storage 3105 may be a hard disk drive or a flash memory. The information processing apparatus can store a program and data in the auxiliary storage 3105, and can load them into the memory 3102 and can use them. The auxiliary storage 3105 can be used as the storage 411 of FIG. 4 or FIG. 8 or the storage 611 of FIG. 6 or FIG. 18.

The medium driving device 3106 drives a portable recording medium 3109, and accesses its recorded content. The portable recording medium 3109 is a memory device, a flexible disk, an optical disk, a magneto-optical disk, or the like. The portable recording medium 3109 may be a compact disk read only memory (CD-ROM), a digital versatile disk (DVD), a universal serial bus (USB) memory, or the like. An operator or a user can store a program and data in the portable recording medium 3109, and can load them into the memory 3102 and can use them.

As described above, a computer-readable recording medium that stores a program and data used in processing is a physical (non-transitory) recoding medium such as the memory 3102, the auxiliary storage 3105, or the portable recording medium 3109.

The network connecting device 3107 is a communication interface that is connected to a communication network such as a local area network or a wide area network, and that performs data conversion associated with communication. The information processing apparatus can receive a program and data from an external apparatus via the network connecting device 3107, and can load them into the memory 3102 and can use them.

When the information processing apparatus is the encoding apparatus 401 of FIG. 8, the network connecting device 3107 can transmit the encoded document 621 to the search apparatus 601. In this case, the network connecting device 3107 is used as the output unit 802.

When the information processing apparatus is the search apparatus 601 of FIG. 18, the network connecting device 3107 can receive the search request 1811 from a user terminal, and can transmit the search result 1815 to the user terminal. In this case, the network connecting device 3107 is used as the output unit 613.

The information processing apparatus does not need all components of FIG. 31, and some of the components can be omitted according to purposes or conditions. As an example, when the information processing apparatus receives the search request 1811 from a user terminal via a communication network, the input device 3103 and the output device 3104 may be omitted. In addition, when the portable recording medium 3109 or the communication network is not used, the medium driving device 3106 or the network connecting device 3107 may be omitted.

When the information processing apparatus is a portable terminal that has a call function, such as a smartphone, the information processing apparatus may include devices for calls such as a microphone and a speaker, or may include an imaging device such as a camera.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a search program that causes a computer to execute a process comprising:
   generating semantic structure information by applying natural language processing to a search target document, the semantic structure information representing a semantic structure of multiple morphemes in the search target document;
   coding the search target document by adding, based on the semantic structure information when it is determined that a first morpheme is not included in a first semantic structure of a first sentence of the search target document, missing-portion information to the missing a code corresponding to a second morpheme of the first semantic structure related to the first morpheme, the missing-portion information indicating that the second morpheme is included in a second semantic structure of a second sentence prior to the first sentence in the search target document;
   receiving a search request including morphemes;
   searching the coded search target document for the morphemes included in the search request; and
   outputting a result of the searching.

2. The non-transitory computer-readable recording medium according to claim 1, wherein the semantic structure of the multiple morphemes is expressed by using a plurality of semantic codes that respectively correspond to the multiple morphemes and a connection relationship among the plurality of semantic codes, the second morpheme corresponds to a semantic code of the first semantic structure, and the missing-portion information includes information that specifies the second sentence.

3. The non-transitory computer-readable recording medium according to claim 2, the process further comprising:
   adding the missing-portion information or non-appearance information to each of the multiple morphemes, the non-appearance information indicating that a morpheme corresponding to a semantic code of a specific morpheme does not appear before the specific morpheme in the search target document.

4. The non-transitory computer-readable recording medium according to claim 2, wherein the semantic structure information includes connection distance information and connection relationship information for each of the plurality of semantic codes, the connection distance information indicating a connection distance to one of the plurality of semantic codes, the connection relationship information indicating a connection relationship with the one of the plurality of semantic codes.

5. A search apparatus comprising:
   a memory that stores a search target document; and
   a processor coupled to the memory and that performs:
      generating semantic structure information by applying natural language processing to the search target document, the semantic structure information representing a semantic structure of multiple morphemes in the search target document;
      coding the search target document by adding, based on the semantic structure information when it is determined that a first morpheme is not included in a first semantic structure of a first sentence of the search target document, missing-portion information to the missing a code corresponding to a second morpheme of the first semantic structure related to the first morpheme, the missing-portion information indicating that the second morpheme is included in a second semantic structure of a second sentence prior to the first sentence in the search target document;
      receiving a search request including morphemes;
      searching the coded search target document for the morphemes included in the search request; and
      outputting a result of the searching.

6. The search apparatus according to claim 5, wherein the semantic structure of the multiple morphemes is expressed by using a plurality of semantic codes that respectively correspond to the multiple morphemes and a connection relationship among the plurality of semantic codes, the second morpheme corresponds to a semantic code of the first semantic structure, and the missing-portion information includes information that specifies the second sentence.

7. The search apparatus according to claim 6, wherein the processor adds the missing-portion information or non-appearance information to each of the multiple morphemes, the non-appearance information indicating that a morpheme corresponding to a semantic code of a specific morpheme does not appear before the specific morpheme in the search target document.

8. A search method comprising:
   generating, by a processor, semantic structure information by applying natural language processing to a search target document, the semantic structure information representing a semantic structure of multiple morphemes in the search target document;
   coding, by the processor, the search target document by adding, based on the semantic structure information when it is determined that a first morpheme is not included in a first semantic structure of a first sentence of the search target document, missing-portion information to the missing a code corresponding to a second morpheme of the first semantic structure related to the first morpheme, the missing-portion information indicating that the second morpheme is included in a second semantic structure of a second sentence prior to the first sentence in the search target document;
   receiving documents a search request including morphemes;
   searching, by the processor, the coded search target document for the morphemes included in the search request; and
   outputting a result of the searching.

9. The search method according to claim 8, wherein the semantic structure of the multiple morphemes is expressed by using a plurality of semantic codes that respectively correspond to the multiple morphemes and a connection relationship among the plurality of semantic codes, the second morpheme corresponds to a semantic code of the first semantic structure, and the missing-portion information includes information that specifies the second sentence.

10. The search method according to claim 9, further comprising:
adding the missing-portion information or non-appearance information to each of the multiple morphemes, the non-appearance information indicating that a morpheme corresponding to a semantic code of a specific morpheme does not appear before the specific morpheme in the search target document.

* * * * *